(12) United States Patent
Lively et al.

(10) Patent No.: US 8,133,308 B2
(45) Date of Patent: Mar. 13, 2012

(54) SORBENT FIBER COMPOSITIONS AND METHODS OF TEMPERATURE SWING ADSORPTION

(75) Inventors: Ryan Lively, Atlanta, GA (US); Ronald R. Chance, Atlanta, GA (US); William J. Koros, Atlanta, GA (US); Harry Deckman, Clinton, NJ (US); Bruce T. Kelley, Kingwood, TX (US)

(73) Assignees: Georgia Tech Research Corporation, Atlanta, GA (US); ExxonMobile Research and Engineering Company, Annandale, NJ (US)

( * ) Notice: Subject to any disclaimer, the term of this patent is extended or adjusted under 35 U.S.C. 154(b) by 799 days.

(21) Appl. No.: 12/163,140

(22) Filed: Jun. 27, 2008

(65) Prior Publication Data

US 2009/0025555 A1    Jan. 29, 2009

Related U.S. Application Data

(60) Provisional application No. 61/051,595, filed on May 8, 2008, provisional application No. 60/946,475, filed on Jun. 27, 2007.

(51) Int. Cl.
*B01D 59/26* (2006.01)
(52) U.S. Cl. .................. 96/154; 95/90; 96/108; 96/153; 165/58; 165/177
(58) Field of Classification Search ............. 95/90, 114; 96/108, 154, 153; 165/58, 177
See application file for complete search history.

(56) References Cited

U.S. PATENT DOCUMENTS

| | | | |
|---|---|---|---|
| 3,925,041 A | 12/1975 | Patterson et al. | |
| 5,139,668 A | 8/1992 | Pan et al. | |
| 5,143,312 A * | 9/1992 | Baurmeister | 242/444 |
| 5,288,304 A * | 2/1994 | Koros et al. | 95/45 |
| 5,820,659 A | 10/1998 | Ekiner et al. | |
| 6,284,206 B1 * | 9/2001 | Lesieur et al. | 422/198 |
| 6,423,123 B1 * | 7/2002 | Rosenberg et al. | 96/154 |
| 6,645,271 B2 * | 11/2003 | Seguin et al. | 95/90 |
| 6,824,592 B2 | 11/2004 | Monzyk et al. | |
| 2003/0196549 A1 * | 10/2003 | Rohrbach et al. | 95/90 |
| 2004/0217049 A1 * | 11/2004 | Bayer et al. | 210/500.36 |
| 2006/0049102 A1 * | 3/2006 | Miller et al. | 210/500.27 |
| 2007/0062870 A1 | 3/2007 | Chen et al. | |

OTHER PUBLICATIONS

International Search Report of PCT Application No. PCT/US2008/068587 dated Oct. 1, 2008 1 page only.

* cited by examiner

*Primary Examiner* — Jason M Greene
*Assistant Examiner* — Anthony Shumate
(74) *Attorney, Agent, or Firm* — Troy S. Kleckley; Ryan A. Schneider, Esq.; Troutman Sanders LLP

(57) ABSTRACT

The various embodiments of the present invention relate to compositions, apparatus, and methods comprising sorbent fibers. More particularly, various embodiments of the present invention are directed towards sorbent fiber compositions for temperature swing adsorption processes. Various embodiments of the present invention comprise sorbent fiber compositions, apparatus comprising a plurality of sorbent fibers, and methods of using the same for the capture of at least one component from a medium, for example $CO_2$ from flue gas.

13 Claims, 15 Drawing Sheets

FIGURES 1 A-B

1. Cooling tower
2. 3-phase electric generator
3. 3-phase unit transformer
4. Steam turbine
5. Condenser
6. Coal conveyor
7. Pulverized coal mill
8. Boiler drum
9. Reheater
10. Superheater
11. Air preheater
12. Air intake
13. Ash hopper
14. Electric precipitator
15. Water systems pump
16. Draft fans
17. Sequestration compressor
18. Fiber sorbent bed "A", sorption
19. Fiber sorbent bed "B", desorption
20. Chimney stack A
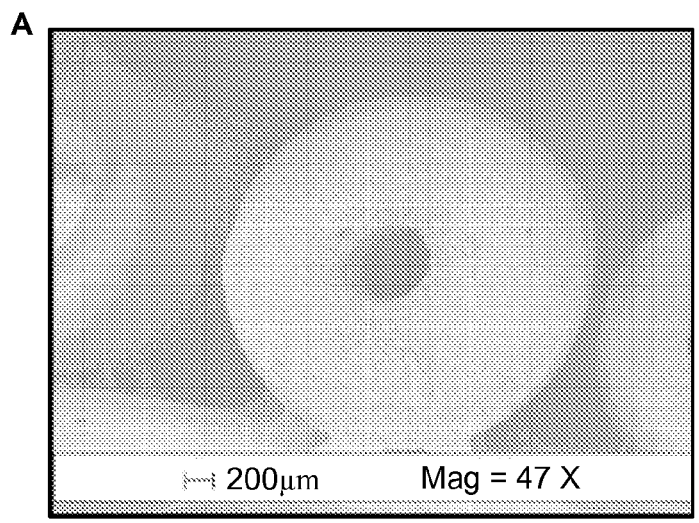
B
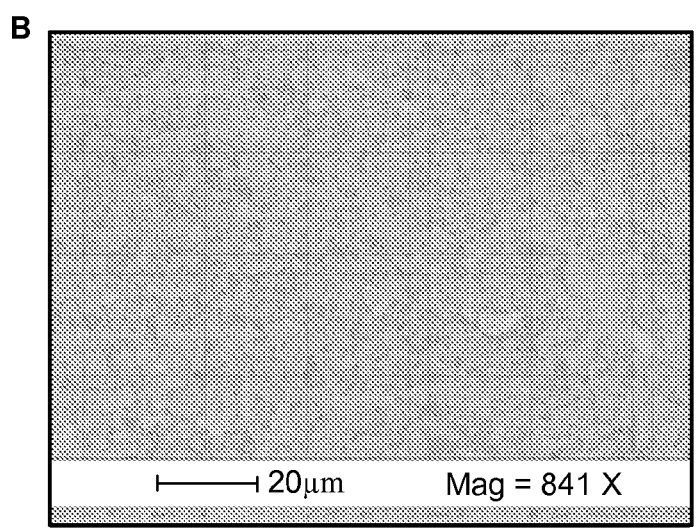
C
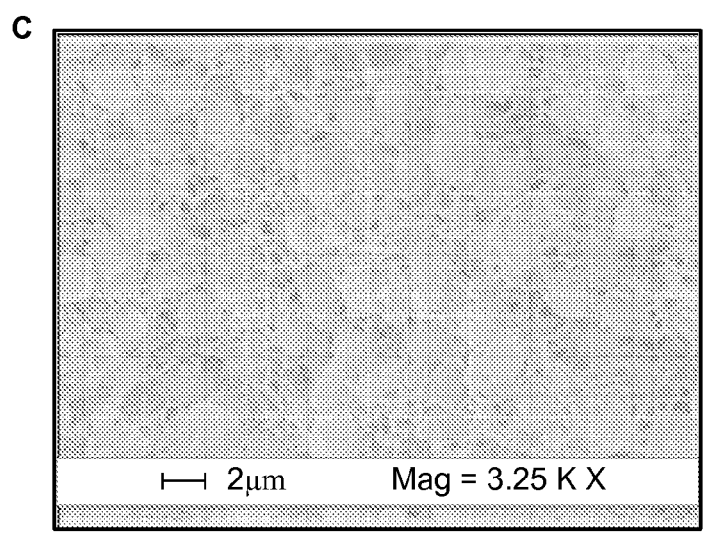
FIGURES 9 A-C

SORBENT FIBER COMPOSITIONS AND METHODS OF TEMPERATURE SWING ADSORPTION

RELATED APPLICATIONS

This application claims, under 35 U.S.C. § 119(e), the benefit of U.S. Provisional Patent Application Ser. No. 61/051,595, filed 8 May 2008, and U.S. Provisional Patent Application Ser. No. 60/946,475, filed 27 Jun. 2007, the entire contents and substance of which are hereby incorporated by reference as if fully set forth below.

TECHNICAL FIELD

The various embodiments of the present disclosure relate generally to sorbent fiber compositions. More particularly, various embodiments of the present disclosure are directed towards sorbent fibers for temperature swing adsorption processes.

BACKGROUND OF THE INVENTION

Coal plants provide the majority of the United States' power and are major point sources for greenhouse gas emissions, such as carbon dioxide ($CO_2$). Developing countries are rapidly building coal power stations at a rate which will add greatly to atmospheric $CO_2$ levels. The most common form of coal power stations are Pulverized Coal (PC) type stations, which typically produce about 500 MW and release approximately 9.2 tons $CO_2$ per minute, or 2.2 $lb_m$ $CO_2$/kWh (for 500 MW). Increased concentrations of $CO_2$ in the earth's atmosphere aggravate the greenhouse gas effect and lead to unwanted climate change, with consequent risks of extreme weather, rising sea levels, and adverse effects on agriculture and biodiversity. Thus, coal fired plants provide prime targets for carbon capture and sequestration (CCS). Accordingly, there is a great interest in efficient and cost-effective methods for CCS.

The PC power station infrastructure is aging, and current carbon capture methods are prohibitively expensive to be implemented as-is. While integrated gasification combined cycle (IGCC) power stations and natural gas combined cycle (NGCC) power stations offer higher efficiencies and lower emissions, the PC infrastructure also needs CCS retrofits for effective climate change mitigation. One of the main hurdles for CCS is the cost of capture. For effective emission controls and sequestration, it is believed that $CO_2$ should be captured at greater than 75% purity and compressed to a pipeline pressure (e.g., about 1500 psia) and subsequently compressed to an injection pressure (e.g., about 2300 psia). The process of post-combustion $CO_2$ capture with low pressure feeds, low temperature feeds, and massive flow rates is one of many difficult aspects of the CCS challenge. Thus, a need exists for a low-cost CCS systems that can be retrofitted onto existing PC plants as well as new IGCC and NGCC plants. Important applications in the petrochemical and industrial sector can also be anticipated.

Adsorption processes are widely used in industry for separation of fluid mixtures. This separation is based on preferential sorption of selective components on the surface or within the cavities of sorbent materials. For most separation systems, the adsorbent material has a large surface area to provide reasonable adsorptive capacities. The commonly used adsorbents, such as molecular sieve zeolites, activated carbon, alumina, and silica gel, have surface areas of at least 200 $m^2/g$.

Many industrial adsorption processes are carried out in fixed-bed type columns. The adsorbent material (e.g., granules, particles) are generally packed and immobilized in a cylindrical vessel. As the fluid mixture designated for separation is passed through the packed column, the adsorbable components in the mixture are taken up and retained by the adsorbent as the adsorbate, and the non-adsorbable components pass through the column via the void spaces among the adsorbent granules.

For continuous processing of a feed fluid mixture, a multi-bed system is used in which each bed goes through the adsorption/regeneration cycle in sequence. Several different regeneration methods have been used commercially, including a pressure swing adsorption (PSA) process and a thermal swing adsorption (TSA) process. In the TSA process, the saturated adsorbent is regenerated by purging with a hot gas. Each heating/cooling cycle usually requires a few hours to over a day. In the PSA process, adsorbent regeneration is effected by purging with a portion of the purified product gas at reduced pressure. The throughput in PSA is generally higher than that of the TSA, since faster temporal cycles, usually in minutes to hours, are generally possible.

Apart from the adsorptive capacity of the adsorbent, the adsorption rate and pressure drop are two important factors that must be considered in adsorbent column design. Pressure drop through the adsorbent column should be minimized, because high fluid pressure drop can cause movement or fluidization of the adsorbent particles, resulting in serious attrition and loss of the adsorbent. The adsorption rate has a significant bearing on the efficiency of the adsorption process. This rate is usually determined by the mass transfer resistance to adsorbate transport from the bulk fluid phase to the internal surfaces of the adsorbent particles. A slow adsorption rate, due to large mass transfer resistance, will result in a long mass transfer zone (MTZ) within which the adsorbent is only partially saturated with adsorbate. The adsorbent in the region upstream of the MTZ is substantially saturated with adsorbate, while that downstream of the MTZ is essentially free of adsorbate. As the fluid continues to flow, the MTZ advances through the adsorber column in the direction of the fluid stream. The adsorption step must be terminated before the MTZ reaches the adsorber outlet in order to avoid the breakthrough of adsorbate in the effluent stream. A long mass transfer zone, which contains a large quantity of partially utilized adsorbent, will, therefore, result in a short adsorption step and inefficient use of the adsorbent capacity.

Both the pressure drop and the mass transfer resistance are strongly influenced by the size of the adsorbent particles. Changing the particle size, unfortunately, has opposite effects on these two important factors. The interstitial space between the adsorbent particles in the fixed-bed is proportional to the size of the particles. Since the resistance to the fluid flow through the adsorber is inversely proportional to the pore size of the packed bed, the use of small adsorbent particles will cause a high pressure drop. For this reason, the sizes of particles of commercial adsorbents for fixed-bed operation are generally larger than 2 mm in average diameter.

In addition, almost all the surface areas of commercial adsorbents are located at the interior of the adsorbent particle. For adsorption to occur, the adsorbate needs to be transported from the external fluid phase to the interior surface of the particle. The transport rate is influenced by two mass transfer mechanisms in series: (a) interfacial mass transfer—diffusion through the fluid boundary layer surrounding the external surface of the adsorbent particle; and (b) intraparticle mass transfer—diffusion through the internal pore space (micropores and macropores) of the particle to its interior surface where adsorption takes place. The size of the particle has significant effects on the rates of these two diffusion processes. Small particles offer large fluid/solid contact areas in the fixed bed for interfacial mass transfer and reduce the path length for the intraparticle diffusion. Hence, small adsorbent particles will increase the adsorption rate and result in a narrow mass transfer zone for fast and efficient operation of adsorption/desorption cycles. Thus, small adsorbent particles are desirable for efficient adsorption processes, but the minimum particle size is limited by acceptable hydrodynamic operating conditions of the fixed bed adsorber. That is, one wants to avoid fluidization and excessive pressure drop.

In regards to CCS, pressure-swing packed bed adsorption has been considered for post combustion capture; however, the large flow rates and the expense of pressurizing the flue gas to the required pressure makes this technology limited to ultra-purification niche markets. Temperature swing adsorption in its current packed bed format cannot be cycled sufficiently frequently to avoid enormous system size and cost. Due to these limitations, the most prominent capture technology is based on liquid-gas column absorption based on chemisorption of the $CO_2$ into liquid alkyl alkanolamines, such as methylethanolamine and methyldiethanolamine. Aside from the intensive energy requirements for solvent regeneration, this capture technology suffers from several problems, including the need to handle large amounts of environmentally hazardous waste, corrosion, entrainment, flooding, and weeping.

Accordingly, there is a need for compositions and methods of adsorbing at least a component of a medium characterized by a relatively small particle size and yet still able to operate with an acceptable pressure drop. It is to the provision of such compositions and methods that the various embodiments of the present invention are directed.

SUMMARY

Various embodiments of the present invention are directed to the composition and use of adsorbent fiber compositions. More particularly, various embodiments of the present disclosure are directed towards adsorbent materials and their use in temperature swing adsorption processes. Broadly described, an aspect of the present invention comprises a sorbent fiber, comprising: a hollow fiber comprising at least one sorbent material; a lumen disposed within the hollow fiber; and a barrier layer lining the lumen to prevent fluid communication between the lumen and the sorbent material.

A hollow fiber can further comprise a polymer matrix. In an embodiment of the present invention, the polymer matrix can comprise a plurality of tortuous pathways. The plurality of tortuous pathways can comprise one or more of a micropore, a mesopore or a macropore, wherein the one or more of a micropore, a mesopore or a macropore are in fluid communication. The hollow fiber can have an average longest cross-sectional dimension of at least about 100 micrometers. The lumen disposed with the fiber can have an average longest cross-sectional dimension of at least about 55 micrometers. The hollow fiber can have an average longest cross-sectional dimension at least two times greater than that of the lumen. The hollow fiber can comprise a non-porous end cap disposed at each longitudinal end of the fiber, wherein the non-porous end cap does not inhibit flow through the lumen. The barrier layer can have an average thickness of less than about 50 micrometers.

The sorbent material is in fluid communication with at least a portion of the plurality of tortuous pathways. The sorbent material can have an average longest dimension of less than about 10 micrometers. The sorbent material can comprise less than about 80% by weight of the fiber. The sorbent material can have a selectivity for carbon dioxide over nitrogen of about 10 to about 60 and a heat of sorption of about −25 kJ/(mol $CO_2$) to about −90 kJ/(mol $CO_2$).

An aspect of the present invention comprises a fiber-based adsorption contactor, the contactor comprising: a chamber comprising: a feed stream inlet; a feed stream outlet; a heat transfer fluid inlet; a heat transfer fluid outlet; a plurality of substantially aligned hollow fibers, wherein each of the fibers comprises: a plurality of tortuous pathways, wherein the tortuous pathways are in fluid communication with the feed stream inlet and the feed stream outlet; a plurality of sorbent elements in fluid communication with at least a portion of the plurality of tortuous pathways; a lumen disposed within the fiber, wherein the lumen is in fluid communication with the heat transfer fluid inlet and the heat transfer fluid outlet; and a barrier layer lining the lumen to prevent fluid communication between the lumen and the plurality of tortuous pathways in at least a substantial majority of the fibers. The plurality of hollow fibers further comprises an end cap disposed at each longitudinal end of the fiber effective to prevent fluid communication between the plurality of tortuous pathways and a heat transfer medium in at least a substantial majority of the fibers. The fiber-based adsorption contactor can further comprise a binder material effective to interconnect adjacent fibers, which in conjunction with the end caps, prevents fluid communication between the heat transfer medium and the plurality of tortuous pathways of adjacent fibers. The fiber-based adsorption contactor can be utilized for feed streams comprising a flue gas, natural gas, fuel gas, bio gas, town gas, waste gas, water, coal gas, air, or a carbon dioxide-containing medium. The fiber-based adsorption contactor can be used in a temperature swing adsorption process. In temperature swing adsorption process, the heat transfer medium for the contact can be water, water vapor, steam, gas, or combinations thereof.

An aspect of the present invention can comprise a method of adsorbing a component of a medium, the method comprising: contacting a medium with a hollow fiber comprising a plurality of tortuous pathways, a plurality of sorbent elements in fluid communication with the plurality of tortuous pathways, a lumen disposed within the hollow fiber, and a barrier layer lining the lumen to prevent fluid communication between the lumen and the plurality of tortuous pathways; and adsorbing a component of the medium. A method of adsorbing a component of a medium can further comprise desorbing the component of the medium. A method of adsorbing a component of a medium can further comprise preventing fluid communication between the medium and a heat exchange medium. The medium comprises flue gas, natural gas, fuel gas, bio gas, town gas, waste gas, water, coal gas, air, or a carbon dioxide containing medium. The component can be selected from $CO_2$, $SO_x$, $NO_x$, and water. In an exemplary embodiment of the present invention, the medium is flue gas, and the component is carbon dioxide. In an embodiment of the present invention, the medium can comprise $CO_2$ and nitrogen, and the sorbent elements can have a selectivity for adsorbing $CO_2$ over nitrogen of greater than 5. The cycle time between successive adsorption steps can be less than about 2 minutes.

Other aspects and features of embodiments of the present invention will become apparent to those of ordinary skill in the art, upon reviewing the following description of specific, exemplary embodiments of the present invention in conjunction with the accompanying figures.

BRIEF DESCRIPTION OF DRAWINGS

FIGS. 9 A-C are scanning electron micrographs of a fiber sorbent (A), a Zeolite 13X dispersion (75 wt %) in a cellulose acetate matrix (B), and 13X particles exhibiting "sieve-in-cage" morphology in a cellulose acetate matrix (C).

DETAILED DESCRIPTION

Figure 1:
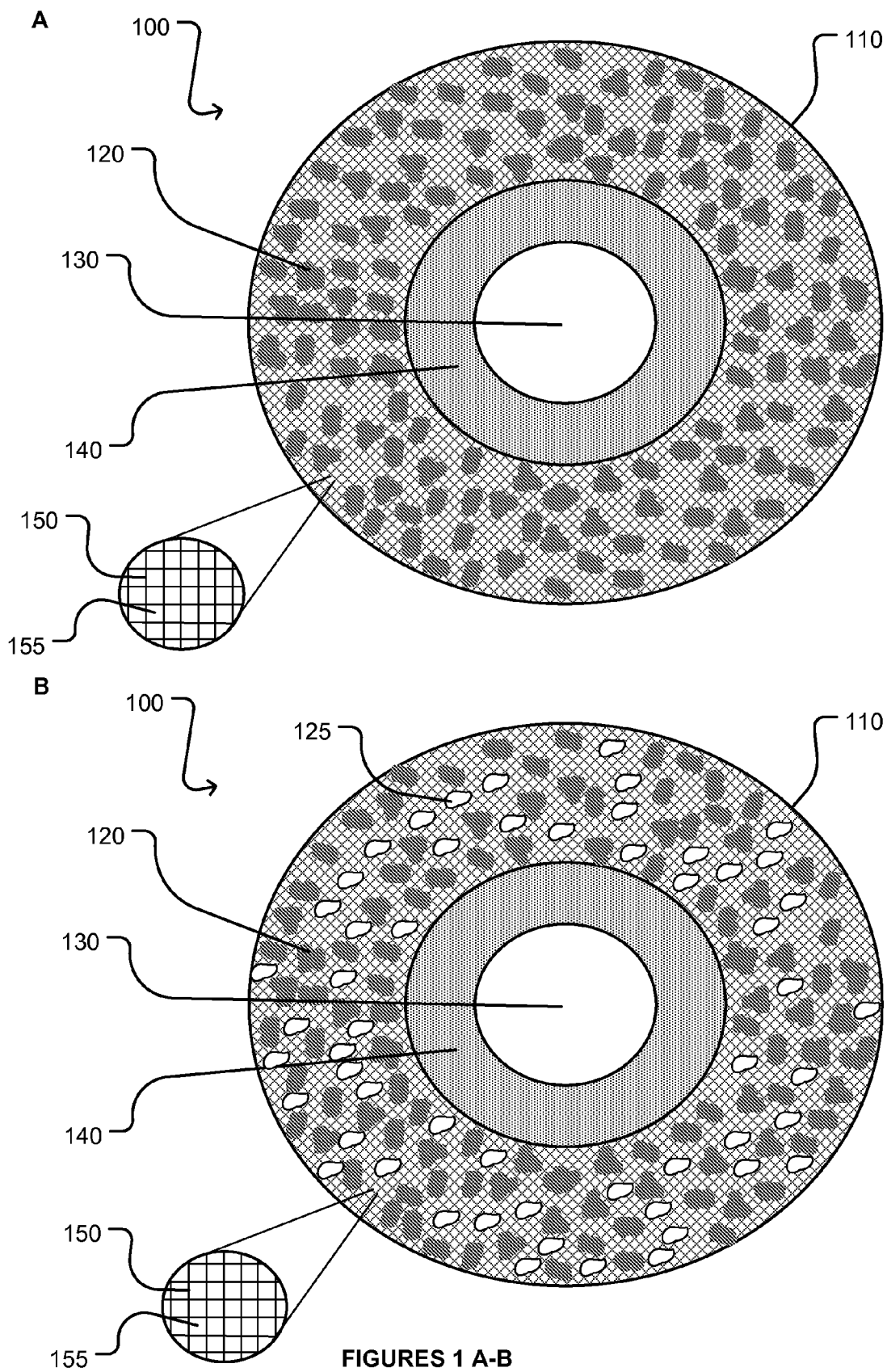
FIGS. 1 A-B illustrate a hollow fiber composition comprising an adsorbent material dispersed in the polymer matrix with an adsorbent material (A) and with a plurality of adsorbent materials (B).

Medium separation is important in various industries, including but not limited to, the production of fuels, chemicals, petrochemicals, and specialty products. The term "medium" is used herein for convenience and refers generally to many fluids, liquids, gases, solutions, suspensions, powders, gels, dispersions, emulsions, vapors, flowable materials, multiphase materials, or combinations thereof. A medium can comprise a feed stream. A medium can comprise a mixture of a plurality of components. The term "plurality" as used herein refers to more than one.

Medium separation can be accomplished by many methods that, assisted by heat, solids, fluids, or other means, generally exploit the differences in physical and/or chemical properties of the components to be separated. For example, gas separation can be achieved by partial liquefaction or by utilizing an adsorbent material that preferentially retains or adsorbs a more readily retained or adsorbed component relative to a less readily adsorbed component of the gas mixture.

One such commercially practiced gas separation process is temperature swing adsorption (TSA). TSA comprises a process wherein a bed of adsorbent material is used to separate one or more components out of a stream of a medium, and then the adsorbent bed is regenerated (releasing the adsorbed components) by increasing the temperature of the bed.

A TSA process can comprise preferential adsorption of at least one component of a medium by an adsorbent material relative to a second component or other components in the medium. The total amount of the at least one component adsorbed from the medium (i.e., the adsorption capacity of the adsorbent material) and the selectivity of the adsorption for one component over another component of the medium, can often be improved by operating the adsorption process under specific pressure and temperature conditions, as both pressure and temperature may influence the adsorption loading of a component of the medium.

An adsorbed component of a medium can be desorbed from an adsorbent material. Desorption of a component occurs because adsorption isotherms are strongly influenced by temperature. Thus, high purities of a component of a medium can be obtained by adsorbing at low temperature, where adsorption is strong, with the release of a strongly held component being possible by means of high temperature for desorption. As compared to pressure swing adsorption (PSA), TSA can be operated in the saturation regime of the isotherm, which provides an advantage for capacity and range of utility of an adsorbent material. In TSA processes, heat for desorption may be supplied directly to the adsorbent material by flowing a hot desorbent medium through the bed, or indirectly to the adsorbent material through a heating coil, electrical heat source, heat transfer medium, or heat exchanger, among others, which are in intimate association with the adsorbent material.

TSA, as practiced in the art, has several disadvantages. For example, in directly heated TSA processes, a hot fluid is typically flowed through the adsorption bed to raise the adsorbent temperature; however, the greater the temperature rise, the more fluid that is needed. This results in the dispersion of the desorbed components in a large volume of heating medium, and the large amount of heat that is used to raise the adsorbent temperature is often not recoverable. In some cases, the heat is not recoverable because many directly-heated TSA systems are operated with long adsorption times (e.g., days) and much shorter regeneration times. Furthermore, the occasional and gradual regeneration of the adsorbent material gives rise to concentration and flow variations in downstream equipment that can be difficult to manage in an otherwise steady state process plant. In indirectly heated TSA systems, heat can be supplied with a heat exchanger, which avoids dilution of the adsorbed component by the heat transfer medium; however, heat management and the cyclic nature of indirectly heated TSA processes often present difficulties. Although various swing adsorption methods have been commercially practiced over the years, there still remains a need in the art for improved swing adsorption methods, particularly when separating $CO_2$ from flue gas and for more efficient use of heat generated in the adsorption process.

Referring now to the figures, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. By way of example, the term sorbent is intended to encompass both adsorption and absorption. While reference will be made throughout this disclosure to adsorption and associated compositions, materials, and processes, it should be recognized that absorption is also intended to be encompassed by the description, and vise-versa.

An aspect of the present invention comprises a sorbent composition 100, comprising a fiber 110, which itself comprises at least one adsorbent material (and, by extension as described above, at least one absorbent material) 120, a lumen 130 disposed within the fiber 110, and a barrier layer 140 lining the lumen 130 to prevent fluid communication between the lumen 130 and the at least one adsorbent material 120. (See, FIG. 1). In an embodiment of the present invention, a fiber 110 can comprise a polymer network 150, the polymer network 150 comprising a plurality of tortuous pathways 155. A fiber 110 comprises many classes of materials that are continuous, flexible, filaments or are in discrete elongated pieces, similar to lengths of thread. As used herein, a "fiber" means a continuous, flexible, filamentous material having a relatively high aspect ratio (i.e., ratio of length to average longest cross-section). In an embodiment of the present invention, an aspect ratio can be at least about 4:1. In an embodiment of the present invention, an aspect ratio can be at least about 10:1, at least about 100:1, or at least about 1000:1.

A fiber 110 can have many cross-sectional shapes, including, but not limited to, a rectangular shape, a circular shape, a semicircular shape, a square shape, a pentagonal shape, a triangular shape, a hexagonal shape, an octagonal shape, a star-shape, a starburst shape, a "U" shape, a lobed shape, a multi-lobed shape, an arbitrary shape, or combinations thereof or therebetween. One of ordinary skill in the art would realize that the cross-sectional shape of the fiber 110 will determine the average longest cross-sectional dimension of the fiber. For example, the average longest cross-sectional dimension of a fiber having a circular cross-sectional shape will be the diameter of the fiber. In an alternative example, the average longest cross-sectional dimension of a fiber having a rectangular cross-sectional shape will be the diagonal between the length and width of the rectangular cross-section of the fiber. In yet another example, the average longest cross-sectional dimension of a fiber having a starburst cross-sectional shape will be the distance between the two furthest points of the starburst cross-section of the fiber.

In an embodiment of the present invention, a fiber 110 has an average longest cross-sectional dimension of at least about 100 micrometers, or at least about 500 micrometers, or at least about 1000 micrometers, or at least about 2000 micrometers. In an embodiment of the present invention, a fiber 110 has an average longest cross-sectional dimension of about 1200 micrometers. In an exemplary embodiment of the present invention, a fiber, having a circular cross-section, has an average diameter of about 1200 micrometers. Fibers can comprise diameters ranging from about 800 to about 1500 micrometers.

A lumen 130 can have many cross-sectional shapes, including, but not limited to, a rectangular shape, a circular shape, a semicircular shape, a square shape, a pentagonal shape, a triangular shape, a hexagonal shape, an octagonal shape, a star-shape, a starburst shape, a "U" shape, a lobed shape, a multi-lobed shape, an arbitrary shape, or combinations thereof or therebetween. One of ordinary skill in the art would realize that the cross-sectional shape of the lumen 130 will determine the average longest cross-sectional dimension of the lumen. For example, the average longest cross-sectional dimension of a lumen having a circular cross-sectional shape will be the diameter of the lumen. In an alternative example, the average longest cross-sectional dimension of a lumen having a rectangular cross-sectional shape will be the diagonal between the length and width of the lumen. In yet another example, the average longest cross-sectional dimension of a lumen having a starburst cross-sectional shape will be the distance between the two furthest points of the starburst cross-section of the lumen.

In an embodiment of the present invention, a lumen 130 has an average longest cross-sectional dimension of at least about 50 micrometers, or at least about 200 micrometers, or at least about 500 micrometers, or at least about 1000 micrometers. In an embodiment of the present invention, a lumen 130 has an average longest cross-sectional dimension of about 300 micrometers. In an exemplary embodiment of the present invention, a lumen, having a circular cross-section, has an average diameter of about 300 micrometers. Lumens can comprise diameters ranging from about 200 to about 500 micrometers.

In an embodiment of the present invention, a fiber 110 can have the same or similar cross-sectional shape as its lumen 130. In an embodiment of the present invention, a fiber 110 can have a different cross sectional shape as compared to its lumen 130. In an embodiment of the present invention, the ratio of the average longest cross-sectional dimension of fiber to the average longest cross-sectional dimension of the lumen is greater than about 2:1, or greater than about 4:1. In an exemplary embodiment of the present invention, the ratio of the average longest cross-sectional dimension of fiber to the average longest cross-sectional dimension of the lumen is about 4:1.

In an embodiment of the present invention, a fiber 110 comprises at least one adsorbent material. In an embodiment of the present invention, a fiber can comprise a plurality of adsorbent materials, including at least one adsorbent material 120 or at least two adsorbent materials 120 and 125. (See FIG. 1B). Various embodiments of the present invention make use of at least one adsorbent material 120 to selectively adsorb at least one component of a medium. The at least one component can comprise many materials, including but limited to, carbon dioxide, hydrogen, nitrogen, oxygen, or water. An adsorbent material comprising molecular sieves, zeolites, silico-aluminophosphate (SAPO) materials, aluminosilicates, aluminophosphate (ALPO) materials, activated carbon, activated alumina, silicates, amine-grafted silica, metal-organic framework materials, covalent organic framework materials, metal-organic polyhedra, zeolite-imidazolate framework materials, polymer-based adsorbents, or combinations thereof, among others.

In an embodiment of the present invention, an adsorbent material can be used to selectively adsorb $CO_2$ from flue gas. When air is utilized in the combustion processes to form a flue gas, there is a resulting large amount of nitrogen in the flue gas. Therefore, it is highly desirable if the sorbent material utilized has a high selectivity for adsorbing $CO_2$ relative to nitrogen. To capture $CO_2$, a flue gas feed stream is contacted with an adsorbent material having a selectivity of greater than about 5 for adsorbing $CO_2$ over nitrogen in the flue gas mixture, or greater than about 10 for adsorbing $CO_2$ over nitrogen in the flue gas mixture. In an embodiment of the present invention, an adsorbent material can have a selectivity for carbon dioxide over nitrogen of about 10 to about 60.

Unless otherwise noted, the term "selectivity" as used herein is based on binary (e.g., pairwise) comparison of the molar concentration of a component adsorbed by the particular adsorbent during the adsorption process under the specific system operating conditions and the molar concentration of a component in a feed stream medium. For a medium containing component A, component B, as well as additional components, an adsorbent that has a greater selectivity for component A than component B will have at the end of the adsorption step of the swing adsorption process cycle a ratio:

$$U_A = \frac{\text{(total moles of } A \text{ in the adsorbent)}}{\text{(molar concentration of } A \text{ in the flue gas in contact with the sorbent)}}$$

that is greater than the ratio:

$$U_B = \frac{\text{(total moles of } B \text{ in the adsorbent)}}{\text{(molar concentration of } B \text{ in the flue gas in contact with the sorbent)}}$$

where $U_A$ is the "Adsorption Uptake of component A" and $U_B$ is the "Adsorption Uptake of component B." Therefore, an adsorbent having a selectivity for component A over component B that is greater than one is represented by:

Selectivity=$U_A/U_B$ (where $U_A > U_B$).

Amongst a comparison of different components in the feed stream medium, the component with the smallest ratio of the total moles picked up in the adsorbent to its molar concentration in the feed is the "lightest component" in the swing adsorption process. It is not necessary that the lightest component have the lowest molecular weight; however, in the case of $CO_2$ and $N_2$, the "lightest" compound in the sense used here is $N_2$. This means that the molar concentration of the lightest component in the stream coming out during the adsorption step is greater than the molar concentration of that lightest component in the feed. In an embodiment of the present invention, an adsorbent compositions can have a selectivity for a first component (e.g., component A) over a second component (e.g., component B) of at least 5, a selectivity for a first component over a second component of at least 10, or a selectivity for a first component over a second component of at least 25.

In an embodiment of the present invention, the loading of $CO_2$ in an adsorbent material can be greater than about 0.25 millimole of $CO_2$ per gram of adsorbent material, greater than about 0.75 millimole of $CO_2$ per gram of adsorbent material, or even than greater than about 1.5 millimole of $CO_2$ per gram of adsorbent material. In an embodiment of the present invention, an adsorbent material can comprise a heat of sorption of about −25 kJ/(mol $CO_2$) to about −90 kJ/(mol $CO_2$). Examples of adsorbent materials that can selectively remove $CO_2$ from nitrogen-containing flue gas mixtures and achieve desired loadings, include, but are not limited to, microporous materials such as zeolites, cationic zeolites, ALPO materials, and SAPO materials. Non-limiting examples of zeolites suitable for use herein include zeolite 4A, 5A, Bx, NaX, and NaY. Non-limiting examples of cationic zeolites include zeolites with Si/Al ratios less than about 5, such as faujasite, Beta, and mordenite. Siliceous zeolites such as MFI can also be used to remove $CO_2$ from nitrogen-containing mixtures. Additional adsorbent materials can comprise hydrotalcite, microporous materials comprising a framework of elements other than Si or Al (such as P), carbon, microporous sol-gel derived materials, silicas, and amines grafted to mesoporous silica, among others. These adsorbent materials can be used alone or in combination with other materials.

In an embodiment of the preset invention, an adsorbent material can comprise about less than 80% by weight of the dry phase of the fiber, or about less than 75% by weight of the dry phase of the fiber, or about less than 70% by weight of the dry phase of the fiber. In an exemplary embodiment of the present invention, the adsorbent material comprises about 65% by weight of the dry phase of the fiber.

In an embodiment of the present invention, a fiber 110 comprises at least one adsorbent material 120. An adsorbent material 120 can comprise an adsorbent layer, an adsorbent particle, an adsorbent entity, a plurality of adsorbent particles, a plurality of adsorbent entities, a sorbent particle, a sorbent entity, a plurality of sorbent particles, or a plurality of sorbent entities, among others. In an embodiment of the present invention, an adsorbent material 120 can have an average longest dimension of less than about 100 micrometers. In an embodiment of the present invention, an adsorbent material can have an average longest dimension of less than about 50 micrometers. In an exemplary embodiment of the present invention, an adsorbent material can have an average longest dimension of less than about 10 micrometers. In an embodiment of the present invention, an adsorbent material can have an average longest dimension of less than about 2 micrometers.

In an embodiment of the present invention, a sorbent composition 100 can comprise a fiber 110 having a barrier layer 140 lining the lumen 130 of the fiber 110 to prevent fluid communication between the lumen 130 and the adsorbent material 120. The barrier layer 140 can comprise many materials, including but not limited to polyvinylidene chloride (PVDC), polyacrylonitrile, epichlorohydrin (Hydrin), polyether amide block co-polymer, glass, silica, alumina, metal, metal oxides, latex, other high barrier polymers, co-polymers thereof, or combinations thereof. In an embodiment of the present invention, the barrier layer 140 has an average thickness of less than about 50 micrometers. In an embodiment of the present invention, the barrier layer 140 has an average thickness of less than about 30 micrometers.

In an embodiment of the present invention, a sorbent composition 100 can comprise a fiber 110 further comprising a polymer matrix 150 comprising a polymer and a plurality tortuous pathways 155 through the fiber. The plurality of tortuous pathways 155 can comprise a plurality of pores, wherein at least a portion of the pores are in fluid communication with one another. In an embodiment of the present invention, the plurality of tortuous pathways 155 can comprise one or more of mesopores, macropores, and micropores, wherein at least a portion of the one or more of mesopores, macropores, and micropores are in fluid communication with one another. In an embodiment of the present invention, the adsorbent material is associated with the polymer matrix. According to various embodiments of the present invention, the plurality adsorbent particles need not be highly bonded to the polymer matrix. In an embodiment of the present invention, the relationship between the adsorbent material and the polymer matrix can be described as a "sieve in a cage." In an exemplary embodiment of the present invention, a fiber can comprise a plurality of adsorbent particles in fluid communication with at least a portion of the plurality of tortuous pathways. Although embodiments of the present invention disclose the dispersion of a plurality of adsorbent particles throughout the fiber, some of the tortuous pathways do not have adsorbent particles associated with them.

A fiber 110 can comprise many polymers, including but not limited to, a cellulose acetate, polyvinylpyrrolidone, polysulfone, epichlorohydrin, a polyether amide block co-polymer, polyimides, polyolefins, polypropylene, polyethylene, polyamides, poly(tetrafluoroethene), polyvinylidene chloride (PVDC), polystyrene, polyisobutylene, polybutadiene, polyurethanes, elastomers, co-polymers thereof, or combinations thereof. A fiber 110 can comprise a glass or ceramic material. A fiber 110 can comprise a combination of a polymer and a glass or ceramic material as well.

In an embodiment of the present invention, a fiber can further comprise an end cap disposed at each longitudinal end of the fiber, wherein the end cap does not inhibit flow through the lumen. The end cap can prevent the fluid communication between the tortuous pathways of the longitudinal end of the fiber and the milieu surrounding the longitudinal end of the fiber.

An aspect of the present invention comprises a method of selectively adsorbing a component of a medium. The method can comprise: contacting a medium with a fiber comprising at least one adsorbent material, a lumen disposed within the fiber; and a barrier layer lining the lumen to prevent fluid communication between the lumen and the adsorbent material; and adsorbing a component of the medium. In an exemplary embodiment of the present invention, a method of adsorbing a fluid comprises contacting a medium with a fiber comprising a plurality of tortuous pathways, a plurality of adsorbent particles in fluid communication with at least a portion of the plurality of tortuous pathways, a lumen disposed within the fiber, and a barrier layer lining the lumen to prevent fluid communication between the lumen and the plurality of tortuous pathways; and adsorbing a component of the medium. The method can further comprise desorbing a component of the medium.

Various embodiments of the present invention are directed to selectively adsorbing a component of a medium, wherein the medium can comprise flue gas, natural gas, fuel gas, bio gas, town gas, waste gas, water, coal gas, air, or a carbon dioxide-containing fluid. In an exemplary embodiment of the present invention, an adsorbent fiber composition can be used in a thermal swing adsorption process for the capture of $CO_2$ from flue gas.

The TSA processes of the present invention can make use of contactor comprising a plurality of fiber-based compositions. The TSA processes of the present invention can utilize a plurality of contactors comprising a plurality of fiber-based compositions. As illustrated in See FIGS. 2 A-B, a contactor can comprise a chamber, which itself, comprises: a feed stream inlet; a feed stream outlet; a heat transfer fluid inlet; a heat transfer fluid outlet; a plurality of substantially aligned fibers. In an exemplary embodiment of the present invention, the fibers comprise: a plurality of tortuous pathways, wherein the tortuous pathways are in fluid communication with the feed stream inlet and the feed stream outlet; a plurality of sorbent elements in fluid communication with at least a portion of the plurality of tortuous pathways; a lumen disposed within the fiber, wherein the lumen is in fluid communication with the heat transfer fluid inlet and the heat transfer fluid outlet; and a barrier layer lining the lumen to prevent fluid communication between the lumen and the plurality of tortuous pathways in at least a substantial majority of the fibers.

Figure 2:
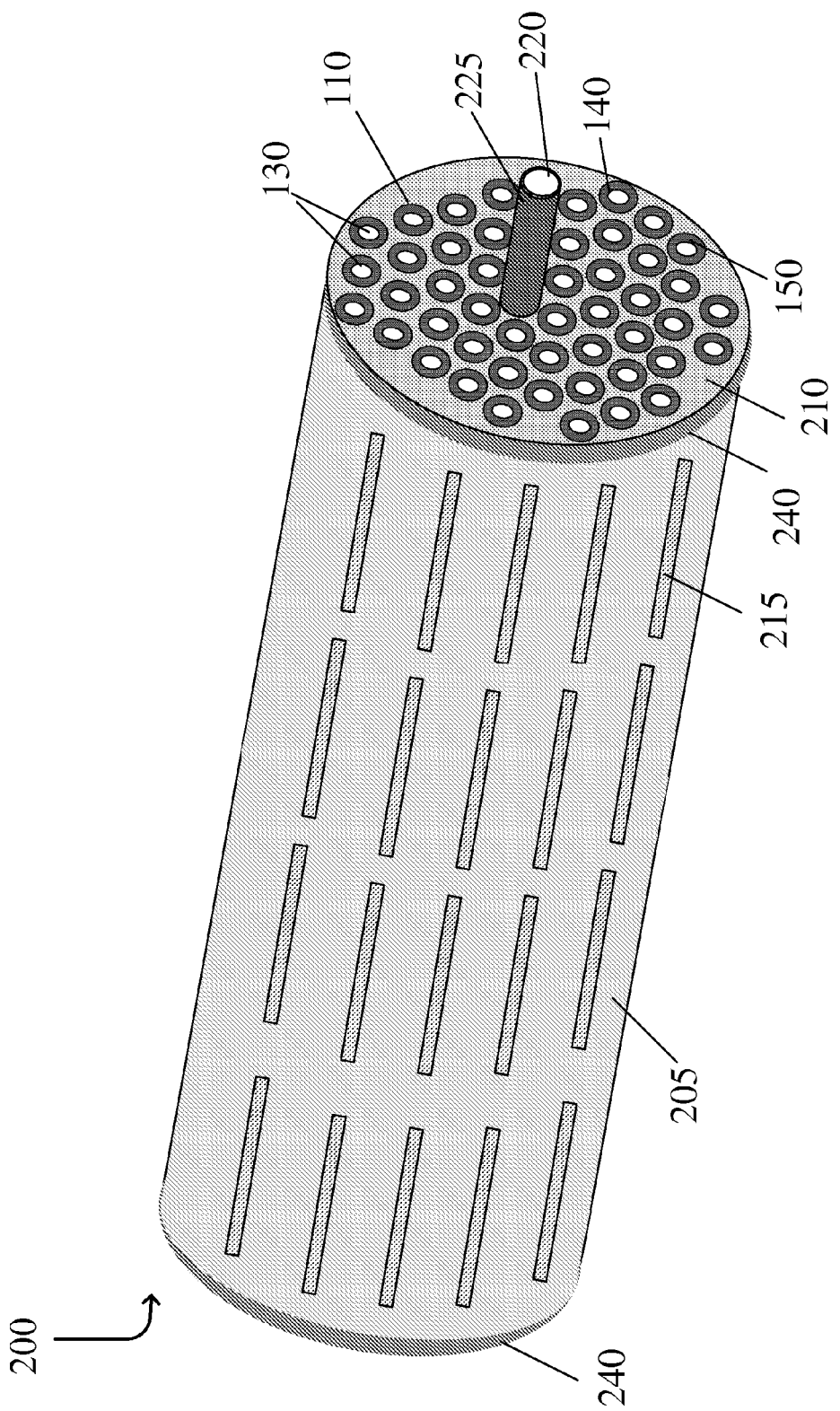
FIGS. 2 A-B provide a schematic of a perspective view of a cross flow contactor comprising a chamber (A) and a transparent chamber (B).
Figure 2:
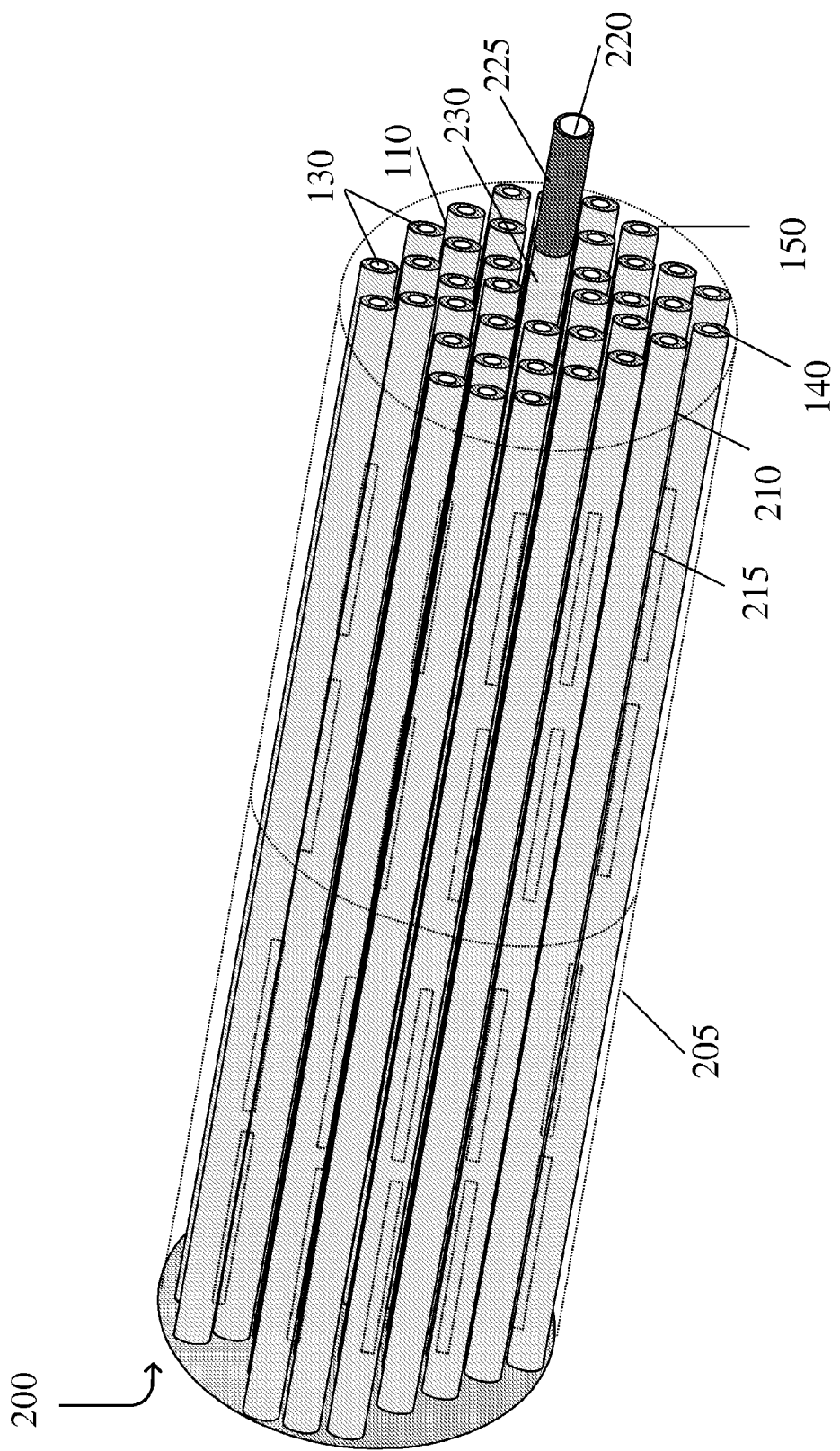

FIGS. 2 A-B provide schematic representations of ways in which structured hollow fiber adsorbents can be formed into a cross flow contactor. A cross flow contactor 200 comprising structured hollow fibers adsorbents 110 is shown in FIGS. 2A and 2B. FIG. 2B shows the contactor of FIG. 2A with the outer surfaces of the chamber of the contactor 205 rendered transparent. In FIG. 2B dotted lines indicate the edges of the outer surface of the contactor. A fiber 110 comprises a polymer matrix 150 comprising a polymer, at least one adsorbent material 120, and a plurality of tortuous pathways. The fiber 110 comprises a lumen 130 disposed within the fiber 110 and a barrier layer 140 lining the lumen 130 to prevent fluid communication between the lumen and the adsorbent material. Since the barrier layer 140 prevents fluid communication between the lumen and the at least one adsorbent material 120, a heat transfer medium can be passed through the lumen 130 of the fiber 110. To act as a diffusion barrier, the effective diffusion coefficient of the barrier layer 140 should be less than about $1/50$ the average diffusion coefficient in the polymer matrix 150 and preferably less than about $1/10,000$ the average diffusion coefficient in the polymer matrix 150. The diffusion barrier effectively precludes heating and cooling fluids fed through the lumen 130 from entering the polymer matrix 150 or the loss of sorbate material, such as $CO_2$, into the lumen fluids.

A plurality of substantially aligned fibers 110 can be arranged in a bundle or splayed. The ends of the fiber bundle can be potted or embedded in a binding material 210. The binding material 210 effectively interconnects adjacent fibers. In an embodiment of the present invention, the binding material fixes the fibers 110 into a substantially parallel array. One method to do this is with an embedding or potting process that surrounds the ends of the fibers with a binding material 210. To visualize the potted fiber array, FIG. 2 B shows the parallel channel fiber contactor with the binding material 210 rendered transparent along with chamber 205. This potted array is then sealed into a chamber 205. Sealing surfaces 240 are provided at the ends of the chamber 205. In operation, the chamber 205 is mounted in a TSA or RCTSA (rapid cycle thermal swing adsorption) module in a manner that prevents fluid communication between the medium for separation and a heat exchange medium. Although the chamber 205 is illustrated as a tubular or cylindrical chamber, the chamber can have many shapes including but not limited to a rectangular or cube shape. Slots 215 are cut through the wall of the chamber 205 to allow gas to pass into the contactor. A central gas collection tube 220 is located in the center of the contactor. The end of the central gas collection tube 225 of the gas collection tube is a solid impermeable material, which can include, but is not limited to, a solid metal or engineering plastic. This allows gas to enter or exit the contactor 200 without mixing with the heating or cooling fluids. The portion of the gas collection tube inside the module 230 is a porous material, such as porous metal or a porous polymer or a woven mesh, among others. This allows gas within the contactor to be efficiently collected. In the adsorption step, flue gas flows into the cross flow contactor 200 through the slots 215 and contacts the hollow fiber adsorbents 110. The polymer matrix 150 comprising at least one adsorbent material 120 removes $CO_2$ and optionally $H_2O$, SOx and NOx from the flue gas. A purified stream is collected in the highly porous section 230 of the central gas collection tube 230. Purified gas passes out of the contactor 200 through the impermeable section 225 of the central gas collection tube 220 that connects to flow control valves (not shown) and an exhaust stack (not shown). To limit the temperature rise during the adsorption step, a cooling medium (e.g., water) is passed through the lumen 130 of the structured hollow fiber 110. After the adsorption step has been completed, the flow of flue gas into the module is shut off with a valve, and a heating medium (e.g., steam) is passed through the lumen 130 of structured hollow fiber 110. $CO_2$ and optionally $H_2O$, SOx and NOx, liberated from the polymer matrix 150, comprising the at least one adsorbent material 120, pass out of the contactor 200 either through the central gas collection tube 220 or through the slots 215.

The fiber-based adsorption contactor comprising the plurality of fibers can further comprise an end cap disposed at each longitudinal end of the fiber effective to prevent fluid communication between the plurality of tortuous pathways and a heat transfer medium in at least a substantial majority of the fibers. The fiber-based adsorption contactor can further comprise a binder material effective to interconnect adjacent fibers, which in conjunction with the end caps, prevents fluid communication between the heat transfer medium and the plurality of tortuous pathways of adjacent fibers.

In various embodiments of the present invention, the contactor 200 can be designed to provide efficient contacting of the medium (e.g., flue gas mixture) with the at least one adsorbent material that selectively removes at least one component from the medium. Efficient contacting minimizes the amount of adsorbent required, volume of the contactor, and energy required to regenerate the contactor. With an efficiently designed contactor, the pressure drop of flue gas, and fluids used to heat or cool the contactor is also minimized. This, in turn, minimizes energy lost from pressure drop of flue gas flowing through the contactor and the energy required to pump or compress the fluids used to heat or cool the contactor.

In an embodiment of the present invention, a fiber-based adsorption contactor is cycled through at least two steps: an adsorption step and a regeneration step. Regeneration of the contactor is achieved by heating the contactor to an effective temperature that will result in desorbing the captured component (e.g., $CO_2$) from the contactor. The contactor is then cooled so that another adsorption step can be completed. Various embodiments of the present invention are directed towards cyclically exposing a plurality of fiber-based adsorption contactors to a heat transfer medium to facilitate adsorption and desorption. The heat transfer medium can comprise many media, including, but not limited to, water, water vapor, steam, or combinations thereof. In an exemplary embodiment of the present invention, water is flowed through the lumens 130 of the plurality of fibers 110 of a fiber-based adsorption contactor 200 for $CO_2$ adsorption and steam is flowed through the lumens 130 of the plurality of fibers 110 of a fiber-based adsorption contactor 200 for $CO_2$ desorption.

One of skill in the art would realize that eventually, the adsorption material of a fiber-based adsorption contactor (e.g., the first contactor) approaches saturation, and an adsorption front breaks through the contactor, resulting in the amount of $CO_2$ being removed from the flue gas falling below a desired value. Consequently, the flow of flue gas to the first contactor can be diverted into a second contactor, which has already been regenerated, while the first contactor is thermally regenerated. Following thermal regeneration, the first contactor is prepared for the adsorption process, and the flow of the flue gas mixture is switched back from the second contactor to the first contactor. The total cycle time is the length of time from when the gaseous mixture is initially conducted to the first contactor in a first cycle to the time when the gaseous mixture is again conducted to the first contactor in the immediately succeeding cycle, i.e., after a single regeneration of the bed. The use of a plurality of contactors (i.e., third, fourth, fifth, etc.) in addition to a first and second contactor can provide continuous processing, especially in instances when adsorption time is shorter than regeneration time.

In an exemplary embodiment, the thermal swing adsorption process comprises rapid cycles of adsorption and desorption, in which case the process is referred to as a rapid cycle thermal swing adsorption (RCTSA) process. A rapid cycle thermal swing adsorption process, for purposes of this disclosure, is defined as one in which the cycle time between successive adsorption steps is less than about 2 minutes, or less than about 1 minute, or less than about 0.5 minutes, or even or less than about 0.25 minutes. In an embodiment of the present invention, the regeneration step can be assisted with a partial pressure purge displacement, or a pressure swing, among others. These combinations of processes are referred to herein as thermal swing processes as long as they employ a thermal swing at some point during the regeneration step.

In many cases, the time required for adsorbent regeneration may be shorter than the time required for the contactor's adsorption capacity to be fully utilized. In such cases, it may be desirable to have a plurality of contactors in the adsorbing phase while a plurality of contactors are in the heating/regeneration phase and the re-cooling phase. In an embodiment of the present invention, a plurality of contactors engaged in adsorption are connected in serial fashion, such that the most-recently regenerated contactor unit is the last bed in line for adsorption, and the first unit in line will be next to be regenerated. In another embodiment, the adsorbing units are connected in parallel, such that each adsorber treats a portion of the whole feed.

Flue gas, or stack gas, is emitted in a wide variety of industrial processes. Pressure of a flue gas is typically slightly above atmospheric pressure and is generally less than about two atmospheres. The temperature of the flue gas is typically in a range from about 100° C. to about 250° C., more typically about 150° C. to about 250° C., but about 30° C. to about 70° C. when wet limestone scrubbing is used to remove SOx. The gaseous components of flue gas generally comprise $N_2$, $O_2$, $CO_2$, and $H_2O$, among others. Small quantities of pollutants such as NOx and SOx are also often present. $CO_2$ concentration in the flue gas is typically in a range of about 3 molar % to about 15 molar %, and $H_2O$ is typically in the range of about 0.1 molar % to about 15 molar %. The total molar concentration of $CO_2+H_2O$ is usually less than about 25% when a stoichiometric combustion produces the stack gas and is usually less than about 15% when dilution or excess air is employed in the process to limit the temperature in the high temperature combustion process.

In some instances, it may be advantageous to separate the $CO_2$ into a concentrated or purified stream, to compress the stream to high pressure, and to introduce it into a suitable underground formation for sequestration to mitigate $CO_2$ emissions. Non-limiting examples of suitable underground formations include, but are not limited to, aquifers having a top seal that prevents significant loss of injected gaseous components, oil reservoirs, gas reservoirs, depleted oil reservoirs, and depleted gas reservoirs. Generally, the separated $CO_2$ has to be compressed to pressures greater than about 1,000 psi, or greater than about 2,000 psi, and often to pressures greater than about 5,000 psi to be injected into these types of underground formations. Low pressure dispositions of the captured $CO_2$ can also be envisioned, examples being enhanced plant growth in green house environments and enhanced algae growth for biofuel production, among others.

The compositions, methods, and apparatus used in the practice of the present invention that are designed for the capture of $CO_2$ from flue gas can be quite efficient. In some instances, $CO_2$ can be captured from flue gas in an amount greater than about 50%, greater than about 75%, greater than about 85%, or greater than about 95% of the $CO_2$ by the adsorbent material. One of ordinary skill in the art would realize that embodiments of the methods of the present invention can involve the capture of less than about 50% of $CO_2$ from flue gas.

In an embodiment of the present invention, adsorbent compositions and methods can comprise the separation of one or more components from a medium. In an embodiment of the present invention, one or more components can be removed from a medium by contacting the flue gas stream to a contactor comprising one or more adsorbent materials. In an embodiment of the present invention, $CO_2$ is captured from flue gas using a swing adsorption process that employs thermal regeneration. In an embodiment of the present invention, a method can further comprise the removal of the water in a flue gas. In yet another embodiment of the present invention, a method can further comprise the removal of SOx and/or NOx.

In an embodiment of the present invention, a contactor can comprise a plurality of fibers, a fiber comprising a mixture of at least one adsorbent material capable of adsorbing different components of the medium. In an embodiment of the present invention, a contactor can comprise a plurality of fibers, a first fiber comprising a first adsorbent material capable of adsorbing a first component of a medium, and a second fiber comprising a second adsorbent material capable of adsorbing a second component of the medium. The use of a plurality of fibers (i.e., third, fourth, fifth, etc.) in addition to a first and second fiber can further provide adsorption of multiple components of a medium.

In an embodiment of the present invention, one or more components of flue gas can be adsorbed by using one or more contactors. In an embodiment of the present invention, a flue gas stream can be passed through a first contactor to remove one component of a medium, and a second contactor to remove another component of the medium (i.e., separate units of operation (e.g., contactors) for each component of the medium). When multiple components are removed from a medium (e.g., flue gas) with one or more contactors, a contactor can be optimized for the removal of a particular component.

In an embodiment of the present invention, one or more contactor can comprise a first contactor to remove water and a second contactor to remove one or more of SOx, NOx, and $CO_2$. One or more contactors can be used because the various embodiments of the present invention disclose methods for regenerating each contactor upon completion of the adsorption step.

In an embodiment of the present invention, a plurality of different adsorbent materials can be used to form a contactor. In such embodiments, an adsorbent material can be selected for the desired removal of a particular component of the medium. A contactor comprising a plurality of adsorbent materials permits the selective removal of a plurality of components with a single contactor. In another embodiment of the present invention, a contactor can comprise an adsorbent material capable of removing a plurality of components from a medium.

An aspect of the present invention comprises a system for the removal of $CO_2$ and water from a flue gas. The system can comprise a contactor comprising a plurality of adsorbent materials, which are independently capable of adsorbing water and/or $CO_2$. In an exemplary embodiment of the present invention, the water selective adsorbent can be located in proximity to the feed stream inlet and the $CO_2$ selective adsorbent can be located downstream from the water selective adsorbent. Such a configuration is designed to first remove the water from a flue gas followed by the removal of $CO_2$, as the flue gas contacts the water selective adsorbent before it contacts the $CO_2$ selective adsorbent. In some embodiments, the same adsorbent material that is used to remove $CO_2$ can also remove and other components of flue gas, such as SOx, NOx, or water, among others. Adsorbent materials that can adsorb SOx, NOx, and water include, but are not limited to, zeolites, cationic zeolites, mesoporous materials, carbons, polymers, mixed matrix materials, and combinations thereof.

In an embodiment of the present invention, a dehydration process can comprise glycol dehydration, which can be used to remove water from a flue gas. In such embodiments, the flue gas can be dehydrated in a separate process or unit operation prior to introduction of the flue gas to the adsorbent contactor. To efficiently remove water with glycol dehydration, the temperature of the flue gas can be reduced to less than about 110° C., or less than about 75° C.

In another embodiment of the present invention, a dehydration process can comprise a physical knockout of condensed water (e.g., such as drops or a mist) prior to contacting the flue gas with an adsorbent contactor. In such embodiments, the contactor can comprise an adsorbent material that selectively removes water from the flue gas. Adsorbents capable of selectively removing water from flue gas include, but are not limited to, cationic zeolites, functionalized microporous and mesoporous materials, carbons, mixed matrix materials, polymers, or combinations thereof.

In various embodiments of the present invention, the processed flue gas exiting the adsorption contactor can be dehydrated to below about 400 ppm, or below about 50 ppm, or below about 20 ppm water content during at least one point during the adsorption cycle.

When a contactor removes a significant fraction (e.g., greater than about 75%) of $CO_2$ and water from a flue gas, an embodiment of the present invention can comprise a thermal regeneration process designed to remove both of these components. In an embodiment of the present invention, the regeneration process can be conducted so that a separate water-rich stream and a separate $CO_2$-rich stream are produced during the thermal regeneration process.

In an embodiment of the present invention, adsorption and regeneration of a contactor is accomplished by externally cooling and heating the contactor, respectively. Externally heated contactors comprise a plurality of lumens to flow a heat transfer medium (e.g., a fluid, liquid, gas) to heat and cool the contactor. In an exemplary embodiment of the present invention, the plurality of lumens are not in fluid communication with the adsorbent material, so that the heat transfer medium does not mix with the feed stream flue gas or $CO_2$ liberated during the regeneration step.

It must be noted that, as used in this specification and the appended claims, the singular forms "a", "an", and "the" include plural referents unless the context clearly dictates otherwise.

All patents, patent applications, and references included herein are specifically incorporated by reference in their entireties.

It should be understood, of course, that the foregoing relates only to exemplary embodiments of the present invention and that numerous modifications or alterations may be made therein without departing from the spirit and the scope of the invention as set forth in this disclosure.

Although the exemplary embodiments of the present invention are provided herein, the present invention is not limited to these embodiments. There are numerous modifications or alterations that may suggest themselves to those skilled in the art.

The present invention is further illustrated by way of the examples contained herein, which are provided for clarity of understanding. The exemplary embodiments should not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Therefore, while embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

EXAMPLES

Example 1

Fiber Composition Design

Figure 3:
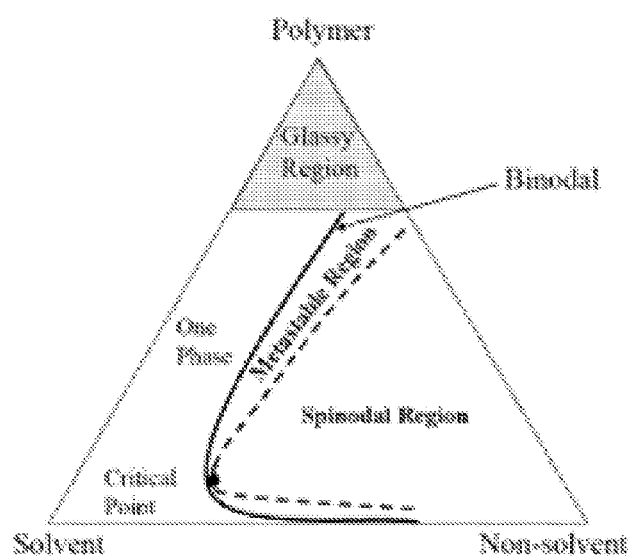
FIG. 3 is a ternary phase diagram illustrating the polymer/solvent/non-solvent solution.

In the present example, a novel hollow fiber based solid sorbent system is considered. The hollow fiber formation is based on the well-known non-solvent phase inversion technique commonly referred to as "wet-spinning" in the field. Polymer solutions comprising solvents, non-solvents, and additives such as lithium nitrate are extruded through a die into a non-solvent quench bath. The non-solvent bath provides the driving force for mass-transfer between the quench bath and the solvent present in the nascent fiber, which results in micro-phase separation and the formation of a porous fiber. The phase separation is best visualized using a ternary phase diagram for the polymer/solvent/non-solvent solution, as seen in FIG. 3. The binodal line represents the divide between one-phase and two-phase regions, and the two-phase region can be further divided into the metastable region and the unstable spinodal region. Spin solutions are made such that the solution exists in the one-phase region near the binodal line. During the spinning process, excess non-solvent from the coagulation bath drives the composition towards the two-phase region, and liquid-liquid demixing occurs, resulting in a continuous polymer pore network.

A method that can be used to characterize polymer and inorganic samples sorption techniques such as those reported by Koros, W. J. and D. R. Paul "Design considerations for measurement of gas sorption in polymers by pressure decay", *J. Polym. Sci.: Part B: Polym. Phys.*, 14, 1903-7 (1976). These techniques are used to determine an equilibrium isotherm for a particular sorbate-sorbent pair by plotting concentration versus pressure at a constant temperature. Furthermore, the time until equilibrium can be measured which provides insight into cycle times that may be used in cyclic adsorption processes. This makes sorption an invaluable characterization method in the study of fiber sorbents. This approach has limitations which limit it mainly to a first cut characterization tool. First, heat cannot be readily mediated inside the sorption system. Secondly, the system is not a flow system, but instead a batch system, so convective mass transfer resistances do not come into play. Finally, only pure gases may be used, so the effects of competitive sorption cannot be accounted for.

Example 2

Fiber System Design

A post-combustion carbon capture system was designed based on a mixed matrix hollow fiber platform. The mixed matrix hollow fiber platform was chosen for several reasons. First, higher sorption efficiencies can be achieved by utilizing the hollow fiber morphology for supplying cooling agents in the bore of the fiber during sorption and heating agents in the bore during desorption. Secondly, the thin porous walls of the fiber allow for very rapid heat and mass transfer times, a necessity in such demanding feeds. Finally, in the design, the heating and cooling agents in the fibers can simply be steam and water, therefore removing any waste by-products associated with the system.

Figure 4:
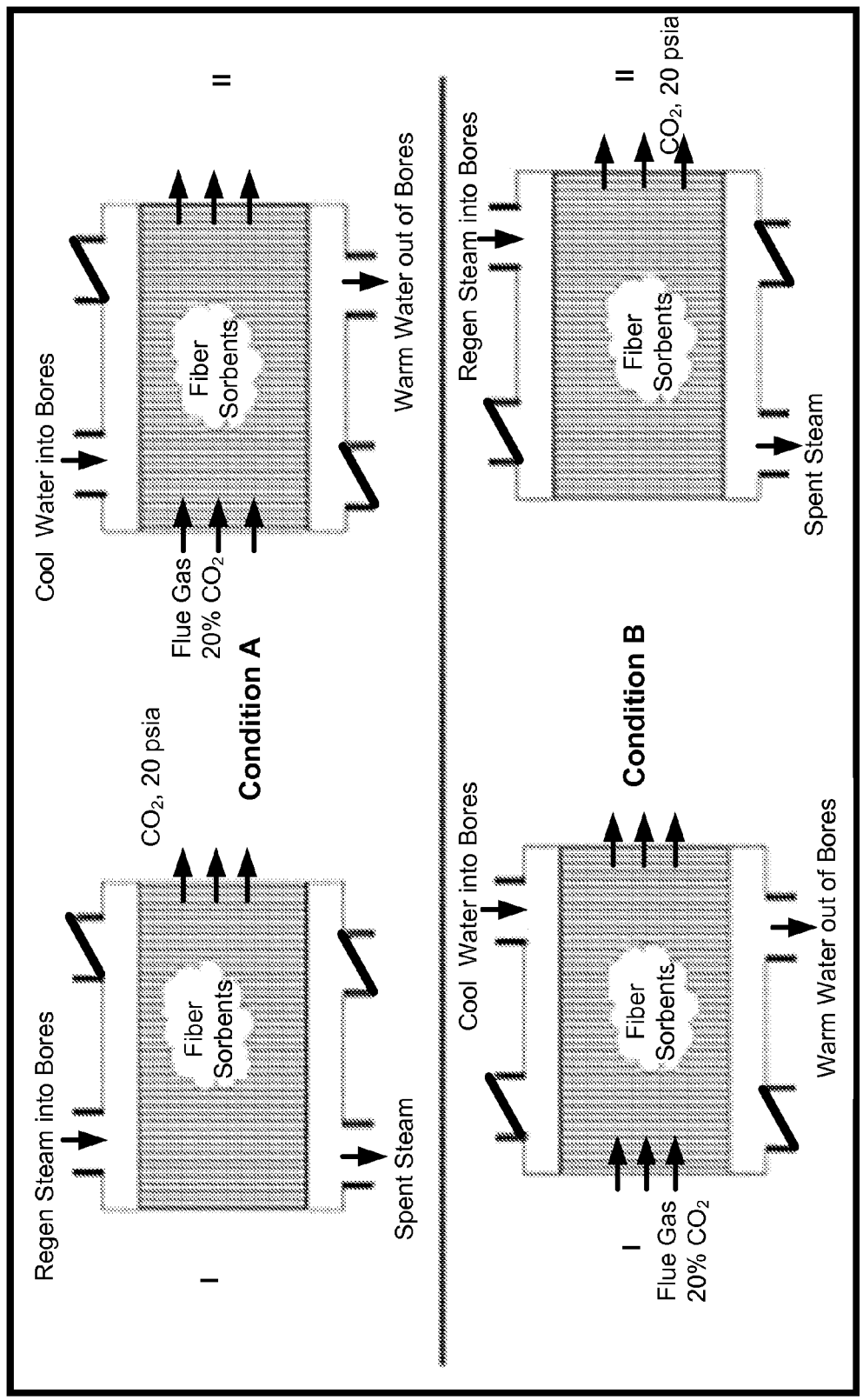
FIG. 4 is a schematic illustrating the damper switching between sorption and desorption modes.

The fiber system was designed using a two bed system with no guard bed for a pseudo-steady state continuous operation. The bed actively sorbing $CO_2$ will have liquid water passing through the bores of the fibers, and the bed actively desorbing will have steam passing through the bore of the fibers, as seen in FIG. 4, below. In both cases, the essentially impermeable lumen layer prevents exchange between the flue gas and the heat transfer water or steam streams. During sorption, flue gas passes over the fibers in a cross-flow heat exchanger arrangement.

The basis used for the design was a 500 MW PC power station. The flue gas conditions being fed to the fiber sorbent system was consistent with such a pulverized coal power station and comprises 1M SCFM feed, 15 mol % $CO_2$, a pressure of 1.1 atm, and at a temperature of 50° C. Several other design constraints were imposed based on current technologies and cost considerations. A paramount goal was the minimization of the pressure drop of the flue gas. The cost to compress such enormous quantities of gas at near ambient pressures was considered to be prohibitively high. Also, to reduce sequestration costs and emissions, the capture efficiency was set at 90% or higher with the product gas being at as high a pressure as possible. Finally, in the fiber design, the mass transfer rate within the fibers was maximized to accommodate the high superficial velocity and short contact time of the flue gas. These and other constraints were optimized with respect to minimizing the pressure drop of the flue gas.

An important factor for many established power stations is the footprint of possible retrofits. Based on factors constraints considered, the fiber manifold was calculated to be large at 12 m long, 12 m tall and 25 m wide, though in comparison to amine stripping facilities this is in fact quite small. An amine stripping system typically has six adsorbers (with a diameter of 22 feet each), six semi-lean strippers (with a diameter of 20 feet each), and three lean strippers (each with a diameter of 21 feet). The fiber system has a foot print of approximately 300 $m^2$ whereas the amine system has a foot print of approximately 600 $m^2$. In order to minimize pressure drop, the bed had to be only 12% filled. Combining this with the optimized outer diameter of the fibers being 1200 microns, the number of fibers can be easily determined to be 32 million fibers per bed. Whereas this is by no means small, industrial-use hollow fiber modules can contain 150 million fibers, so the number is not unreasonable for such a large feed stream.

The next determination to be made was the choice of sorbent and the amount of sorbent to be dispersed into the polymer fiber matrix. A goal of 65 wt % sorbent in the fibers was set due to the necessity for large $CO_2$ capacities per fiber. The fiber inner diameter was set at 320 microns. This large OD/small ID fiber with high sorbent loading allows for large amounts of $CO_2$ to be captured per fiber within the design constraints. Three sorbent choices were initially considered based on the difficulty of implementation and availability. The first choice was the traditional industry standard for $CO_2$ sorption, Zeolite 13X. In comparison with other sorbents, its capacity for $CO_2$ was quite high and its heat of sorption was low. In Table 1, the various sorbent qualities are compared. The next sorbent choice was high-silica MFI. This sorbent offers the advantage that it is very hydrophobic, has a lower heat of sorption than 13X, and comparable $CO_2$ capacities. Finally, a third sorbent choice was amines grafted onto mesoporous silica. These amine-based sorbents offer the significant advantage that $CO_2$ sorption capacity increases in wet feeds such as flue gas. These sorbents however usually have much higher heats of sorption than either 13X or MFI, and as such, more desorption steam and more cooling water would be required to operate the system. Furthermore, significant research still needs to be done to determine the stability of these anchored amines under long term operating conditions.

TABLE 1

| Sorbent | Zeolite 13X | High Silica MFI | Anchored Amines |
|---|---|---|---|
| CO2 Dry Sorption Capacity [mmol/g], 40° C. | 1.4 | 1.55 | 0.66 |
| CO2 Wet Sorption Capacity [mmol/g], 40° C. | 0.09 | — | 0.73 |
| Heat of Sorption [J/mol] | −36,000 | −26,000 | −55,000 |
| Diffusion Coefficient [cm²/s] | $1.8 \times 10^5$ | $9 \times 10^{-7}$ | — |

Finally, the sorbent loading in the fiber was a determining factor, and 75 wt % loading of sorbent in the fiber was chosen as an attainable goal based on some preliminary spinning screening studies.

Using the sorption properties of MFI, cycle properties of the RTSA fiber system can be determined. A typical 500 MW power plant releases 9.2 tons of $CO_2$ per minute, and by doing a simple mass balance over the system, the amount of $CO_2$ captured per cycle can be found as well as the cycle time. Assuming that the heat of desorption during the sorption step moderates the temperature of the sorbents such that they only experience a moderate temperature rise, and as such, the $CO_2$ sorbent will only be at 50° C., and sorption will occur at 35° C. Therefore:

$$\text{Capacity} = (K_{D,35°C.} - K_{D,50°C.})P_{CO2}V_{sorbent}$$

at 15° C.:

$$K_{D_{40C}} = \frac{1.55 \text{ molCO}_2}{\text{kg} - MFI} \frac{760 \text{ mmHg}}{180 \text{ mmHg} - \text{atm}} \frac{44 \text{ gCO}_2}{\text{g mol}} \frac{1.6 - MFI}{\text{cm}^3 - MFI} \frac{1 \text{ kg}}{1000 \text{ g}} = 0.46 \frac{\text{gCO}_2}{\text{cm}^3 13X - \text{atm}}$$

Need $K_{D,50°C.}$, $K_{D,35°C.}$:

$$\ln\left[\frac{K_{D,50°C.}}{K_{D,40°C.}}\right] = \frac{-\Delta H_{SORP}}{R}\left[\frac{1}{323K} - \frac{1}{313K}\right] = \ln\left[\frac{K_{D,50°C.}}{0.46}\right] =$$

$$\frac{26,000}{8.314}\left[\frac{1}{323K} - \frac{1}{313K}\right] \Rightarrow K_{D,50°C.} = 0.36 \frac{\text{gCO}_2}{\text{cm}^3 13X - \text{atm}}$$

$$\ln\left[\frac{K_{D,35°C.}}{K_{D,40°C.}}\right] = \frac{-\Delta H_{SORP}}{R}\left[\frac{1}{308K} - \frac{1}{313K}\right] = \ln\left[\frac{K_{D,35°C.}}{0.46}\right] =$$

$$\frac{26,000}{8.314}\left[\frac{1}{308K} - \frac{1}{313K}\right] \Rightarrow K_{D,35°C.} = 0.58 \frac{\text{gCO}_2}{\text{cm}^3 13X - \text{atm}}$$

So the system picks up:

$$m_{CO2,Cycle} = (0.58 - 0.36)\frac{\text{gCO}_2}{\text{cm}^3 MFI - \text{atm}} \frac{0.15 \text{ atm}}{} \frac{1.05 \times 10^8 \text{ cm}^3 13X}{} = 3.47 \times 10^6 \text{ gCO}_2/\text{cycle}$$

From here, the cycle time was determined by determining the flue gas $CO_2$ flow rate:

$$n_{flue} = 1 \times 10^6 scfm \frac{\text{lbmol}}{359 scf} \frac{454 \text{ mol}}{\text{lbmol}} = 1.27 \times 10^6 \text{ mol/min}$$

$$\dot{m}_{CO2} = 0.15 \times 1.27 \times 10^6 \text{ mol/min} \cdot 44 \frac{\text{g}}{\text{mol}} = 8.35 \times 10^6 \text{ gCO}_2/\text{min}$$

$$\delta t = \frac{3.47 \times 10^6 \text{ gCO}_2/\text{cycle}}{8.35 \times 10^6 \text{ gCO}_2/\text{min}} \cdot 60 \frac{\text{sec}}{\text{min}} = 24.9 \text{ sec}$$

A cycle time of 25 seconds is very rapid considering that typical TSA stripping facilities have cycle times ranging from several hours to days. This rapid cycle time implies that sorbate contact time with the sorbent will be short. To determine this, the superficial velocity was calculated, as can be seen below.

$$V_{Flue} = \left(\frac{50 + 273}{273}\right)\left(\frac{1}{1.5}\right) \times 10^6 scfm = 0.79 \times 10^6 \text{ actual } cfm$$

$$v_{Flue} = \frac{V_{Flue}}{\varepsilon_{Manifold} A_{x,flue}} =$$

$$\frac{0.79 \times 10^6 \text{ acfm}}{0.88 \cdot (600 \text{ cm} \times 2500 \text{ cm})/30.48^2 \left(\frac{\text{cm}^2}{\text{ft}^2}\right) \cdot 60 \text{ sec}} = 9.25 \text{ fps}$$

From here, the contact time was found to be 4.3 seconds (39.4 ft path length, with a velocity of 9.25 fps). This sets the upper limit of time available for mass transport in a fiber.

Once the fiber manifold and the fiber sorbents were sized, the pressure drop of the flue gas through the bed could be calculated. To minimize pressure drop while providing good mass transfer, the cross-flow heat exchanger flow pattern was chosen, and the pressure drop across fiber bed could calculated using the equation for pressure change across tube bundles.

$$Re = \frac{D_V v_{Flue} \rho_{flue}}{\mu_{flue}} =$$

$$\frac{(1200 \times 10^{-4} \text{ cm}) \cdot (9.25 fps \cdot 30.48)(1.022 \times 10^{-3} \text{ g/cm}^3)}{2.0 \times 10^{-4} \text{ g/cm} - s} = 172$$

This is of the order of magnitude of the transition region for flow through a fiber bed, therefore that case was used (which will result in a conservatively higher pressure drop).

$$\Delta P_{Flue} = \frac{4 f_f N_r \rho_{flue} v_{flue}^2}{2 g_c}\left(\frac{\mu_s}{\mu_b}\right)^{0.14}$$

$$f_f = 0.43$$

$N_r$ is a measure of how many obstacles a typical "packet" of gas will bump into in its run through the manifold. This was estimated as, $$W_{manifold} \cdot L_{manifold} = N_{fibers} \cdot L_0^2$$

where $L_0$ is the dimension of an obstruction containing cell. Once this characteristic dimension was found, the number of obstructions was estimated simply as:

$$N_r = \frac{L_{manifold}}{L_0} = 2,000$$

The resulting pressure drop was found to be 0.15 atm. In order to compress the feed gas to 1.15 atm, an additional draft fan would be needed, or a positive displacement blower.

Of concern for actual retrofits is the carbon capture system parasitic load on the power station. Two of the main parasitic loads found in this system were the use of steam and the addition of another cooling tower. To determine the total amount of steam and water required, material and energy balances were performed over the system during the sorption and desorption steps. A typical heat exchanger approach $\Delta T$ of 5° C. was chosen for the sorption step. Ambient condition water at 25° C. was assumed to be heated to 35° C., while the shell-side flue gas was assumed to be cooled from 50° C. to 40° C.

$$Q_{Sorption} = \dot{m}_{flue} C_{P,Flue} \Delta T_{Flue} + \dot{n}_{CO2} \Delta H_s$$

$\dot{m}_{flue} = 1 \times 10^6$ scfm $= 4.06 \times 10^4$ kg/min of flue $C_{P,Flue} = 1042$ J/kg-K $\Delta T_{Flue} = 10 K$ $\dot{n}_{CO2} = 1.86 \times 10^5$ mol·CO$_2$/min $\Delta H_s = 26,000$ J/mol $\Rightarrow$ $Q_{Sorption} = 5.57 \times 10^9$ J/min Since the heat added via sorption is removed by the water in the bore, those heats were set equal and the required amount of cooling water was determined.

$Q_{Water} = Q_{Sorption} =$ $\dot{m}_{Water} C_{P,Water} \Delta T_{Water} - m_{MFI} C_{P,MFI} \Delta T_{MFI} - m_{poly} C_{P,poly} \Delta T_{poly}$ $C_{P,Water} = 4,184$ J/kg−K $\Delta T_{poly} = 15 K$ $\Delta T_{MFI} = 15 K$ $C_{P,MFI} = 800$ J/kg·K $C_{P,poly} = 1,600$ J/kg·K $m_{MFI} = 1.05 \times 10^8 \text{ cm}^3 MFI \cdot \frac{1.6 \text{ g}}{\text{cm}^3} = 168,000$ kg $m_{poly} = 4.6 \times 10^7 \text{ cm}^3 \frac{1.2 \text{ g}}{\text{cm}^3} = 55,200$ kg $\Delta T_{Water} = 10 K$ $\Rightarrow \dot{m}_{Water} = 2.5 \times 10^5$ kg/min $= \underline{56000 \text{ gpm}}$ The resulting water flow rate of 56,000 gpm represents a significant capital investment due to ducting requirements. During desorption, the steam was assumed to have a latent enthalpy of exhaust steam as a worst case approximation. Furthermore, the condensed steam was assumed to lose more of its specific heat, cooling down to 40° C. before being pumped back into the steam condenser system in the power station. Higher quality steam with more latent heat can be used, thereby allowing for less steam to be used, though at a higher cost, unless waste steam is available. Opportunities for optimization in that regard certainly exist.

$$Q_{REQ'D} = n_{CO2} \Delta H_S + m_{MFI} C_{P,MFI} \Delta T_{MFI} + m_{poly} C_{P,poly} \Delta T_{poly}$$

$$n_{CO2} = \frac{8.35 \times 10^6 \text{ gCO}_2}{\text{min}} \frac{1 \text{ molCO}_2}{44 \text{ g}} \frac{1 \text{ min}}{60 \text{ sec}} \frac{25 \text{ sec}}{\text{cycle}} = \frac{79,000 \text{ mol·CO}_2}{\text{cycle}}$$

$\Rightarrow Q_{REQ'D} = 5.6 \times 10^9$ J/cycle

For the system to be in equilibrium in each cycle, the amount of heat removed by the steam must equal the amount of heat required for desorption. If the low quality steam does not supply enough latent heat, then we assume the steam will condense, and we have taken a value of a 60° K drop in temperature for the condensed steam to be reasonable for the case of low quality steam used as the desorption heat source.

$$Q_{Steam} = \dot{m}_{steam} \Delta H_{Vap} \delta t + \dot{m}_{steam} C_{P,Steam} \Delta T_{Steam} \delta t = Q_{REQ'D}$$

$\Delta H_{Vap} = 2,250,000$ J/kg $\delta t = 25$ sec $= 0.42$ min $C_{P,Steam} = 2050$ J/kg·K $\Delta T_{Steam} = 60 K$ $\Rightarrow \dot{m}_{steam} = \underline{5,300 \text{ kg/min}}$ This number was used to determine the parasitic load on the power station efficiency. The pressure drop required to pump these heat transfer fluids through the bores of the fibers can be calculated using the Hagen-Poiseuille equation, assuming incompressible flow and Newtonian fluids. The steam required per ton of CO$_2$ captured is a useful comparison between different carbon capture approaches and can be calculated as:

$$\frac{\dot{m}_{steam}}{\dot{m}_{CO_2 Captured}} = \frac{\frac{5300 \text{ kg}}{\text{min}} \frac{\text{ton}}{907.5 \text{ kg}}}{\frac{8.5 \text{ ton}}{\text{min}}} = \underline{0.69}$$

The low steam requirements of the fiber sorbent system exemplifies the one of the main advantages of this technology. Traditional gas-liquid amine contactors have regeneration requirements of 1.3-1.5 tons of steam per ton of CO$_2$.

Water will have a substantially higher pressure drop than steam; therefore, water was used to determine the pressure drop in the bores.

$$v_{water} = \frac{\frac{\dot{m}_{water}}{\rho_{water}}}{A_{x,Total}} =$$

-continued $$\frac{\frac{2.1 \times 10^5 \text{ kg/min}}{1000 \text{ kg/m}^3}}{(31.8 \times 10^6)(\pi \cdot (160 \times 10^{-4} \text{ cm}/100)^2)} = 8280 \text{ cm/min} = 138 \text{ cm/s}$$

$$v_{Water} = \frac{R_i^2 \Delta P}{4\mu L_{Fiber}}$$

$$\Delta P_{Water} = \frac{v_{Water} \cdot 4\mu L_{Fiber}}{R_i^2} = \frac{138 \text{ cm/s} \cdot 4 \cdot (0.0048 \text{ g/cm} - \text{s})(600 \text{ cm})}{(160 \times 10^{-4} \text{ cm})^2 \cdot 10} =$$

$$623 \text{ kPa} = \underline{90.37 \text{ psia}} = 5 \text{ atm}$$

Since the steam is assumed to condense in the bores during the desorption step, the pressure drop required will be negligible in comparison to that for the water used in the bores during the sorption part of the cycle.

One of the many issues associated with the fiber sorbent system design was the time required for heat and mass transfer. Mass transfer correlations for laminar flow past tube bundles were used to determine the mass transfer coefficient of $CO_2$ through the fiber wall.

$$\frac{k_c d}{D_{AB}} = 0.82 \cdot Re^{1/2} \left[\frac{\mu}{\rho D_{AB}}\right]^{0\ldots33}$$

$$Re = 360$$

$$D_{CO2-N2} = 0.2 \text{ cm}^2/\text{s} \; [18]$$

$$k_c = \frac{0.2 \text{ cm}^2/\text{s}}{1200 \times 10^{-4} \text{ cm}} \cdot 0.82 \cdot 360^{0.5} \cdot \left(\frac{2 \times 10^{-4}}{1.3 \times 10^{-3} \cdot 0.2}\right)^{0.33} \approx 23.8 \text{ cm/s}$$

Moreover, one can estimate the effective diffusivity in the porous fiber wall, viz, $$D_e = \frac{D_{AB}\varepsilon_{fiber}}{\tau}$$

$$\tau \sim 3$$

$$\varepsilon_{fiber} = 0.50$$

$$D_e = 0.033 \text{ cm}^2/\text{s}$$

From this, the extent of external mass versus internal mass transfer limitations was calculated.

$$\alpha = \frac{k_c l}{K D_e}$$

$$K = \frac{(0.58 - 0.36) \text{gCO}_2}{\text{cm}^3 MFI - \text{atm}} \frac{\text{mol}}{44 \text{ g}} \frac{1 \text{ atm}}{1.01 \text{ bar}} \frac{83.14 \cdot 323K}{} = 133$$

$$\alpha = \frac{23.8 \text{ cm/s}(440 \times 10^{-4} \text{ cm})}{132(0.033 \text{ cm}^2/\text{s})} = 0.24$$

The $\alpha$ value was found to be low, indicating external mass transfer limitations. The time for 90% saturation was found to be approximately 0.55 seconds, thus setting the minimum required contact time. To further ensure the validity of this carbon capture approach, the time required for thermal equilibrium in the fibers must be calculated. As a limiting case, the flow was assumed to be fully developed such that the Nusselt number was set.

$$Nu = 3.44 = \frac{h(l_{fiber\,wall})}{k_{water}}$$

$$k_{water} = 0.64 \; \frac{W}{\text{m} \cdot K}$$

$$\Rightarrow h = \frac{3.44 \cdot (0.64 \text{ W/m} \cdot K)}{(440 \times 10^{-4} \text{ cm}/100)} = 5000 \; \frac{W}{\text{m}^2 K}$$

The effective thermal conductivity of the fiber wall was then determined as a weighted average of the polymer thermal conductivity, the sorbent particles, and the air in the void spaces and was estimated to be 2.45 W/m-K. Heat transfer charts were employed to determine the time for thermal equilibrium in the fiber walls.

$$\text{Relative resistance } [18]: m = \frac{k_{fiber}}{h_{fiber}(l_{fiber\,wall})}$$

$$m = \frac{2.45 \; \frac{W}{\text{m} \cdot K}}{5000 \; \frac{W}{\text{m}^2 \cdot K}(440 \cdot 10^{-6} \text{ m})} = 1.25$$

$$\text{Relative position}: n = \frac{\text{Distance from center of fiber wall}}{\text{Fiber wall half thickness}} = 0$$

Unaccomplished change in temperature = 0.1%

$$\Rightarrow \frac{\alpha_{polymer} \cdot t_{equilibrium}}{l^2} \cong 11$$

$$\alpha_{polymer} = 7.93 \times 10^{-5} \text{ m}^2/\text{s}$$

$$t_{equilibrium} = \frac{11 \cdot (440 \times 10^{-4} \text{ cm}/100)^2}{7.93 \times 10^{-5} \text{ m}^2/\text{s}} = 0.027 \text{ sec}$$

The time for equilibrium was determined to be 0.027 seconds, which shows that the rapid thermal cycles required are possible. This result also demonstrates that the time required for the $CO_2$ to locally sorb into the sieve embedded in the wall is not significant. The MFI particles were assumed to be 3 micrometer spheres (or cubes), and then time for the sieves to reach 99% of the ultimate equilibrium loading was calculated.

$$D_{CO2-MFI} \text{ is } \sim 9 \times 10^{-7} \text{ cm}^2/\text{s}$$

$$\text{At 99\% uptake, } 0.75 = \sqrt{\frac{D_{AB} t}{R^2}}$$

$$t = \frac{0.75^2 (1.5 \times 10^{-4} \text{ cm})^2}{9 \times 10^{-7} \text{ cm}^2/\text{s}} = 0.014 \text{ sec}$$

If the particles were 0.3 microns, this time scale would be even more insignificant. Therefore the major resistance found was the gas phase resistance. A further check was that of the fiber sorbents strength, performed to determine the viability of the fiber sorbent system. The Von Misen Criterion was used to determine if the fibers could withstand the shell side pressures as well as the bore side pressures.

$$\frac{P_{out}\left[\left(\frac{P_{in}}{P_{out}} - \left(\frac{OD}{ID}\right)^2\right)^2 + 3\left(\left(\frac{P_{out}}{P_{in}} - 1\right)\left(\frac{OD}{ID}\right)^2\right)^2\right]^{1/2}}{\left(\frac{OD}{ID}\right)^2 - 1} \leq \tau_y =$$

Fiber sorbent yield stress

Fiber sorbent yield stress =

$$(1 - \varepsilon)(1 - Y_{13X})\tau_y = (1 - 0.50)(1 - 0.7) \cdot 40 \text{ MPa} = 6 \text{ MPa}$$

$$\frac{1.3\left[\left(\frac{5}{1.3} - (3.75)^2\right)^2 + 3\left(\left(\frac{1.3}{5} - 1\right)(3.75)^2\right)^2\right]^{1/2}}{(3.75)^2 - 1} \cdot 101325 \leq 6 \text{ MPa}$$

2.06 MPa ≤ 6 MPa

Using a cellulose yield stress of 40 MPa, the fibers still hold for both flow conditions.

To ease compression costs, producing high purity $CO_2$ at pressure was the highest pressure possible is important, since compression costs typically scale inversely with the order of magnitude of the initial pressure. After the sorption step ends, and the desorption step begins, the interstitial spaces between the fibers were assumed to be filled with flue gas (15 mol % $CO_2$), and the damper valves closed. As steam flows through the bore, $CO_2$ will begin to desorb and pressurize.

$$n_{CO2,sorbed} = 3.36 \times 10^6 \text{ g} \frac{\text{mol}}{44 \text{ g}} = 76,000 \text{ mol}$$

$$T = 50° \text{ C.} = 323 K$$

$$V = (0.88) \times 1200 \times 2500 \times 600 \text{ cm}^3 = 1.58 \times 10^9 \text{ cm}^3$$

$$P_{CO2} = \frac{76,000 \text{ mol} \cdot \frac{83.14 \text{ cm}^3 \text{ bar}}{\text{mol} \cdot K}}{1.58 \times 10^9 \text{ cm}^3} = 1.3 \text{ bar} = 19 \text{ psi}$$

Figure 5:
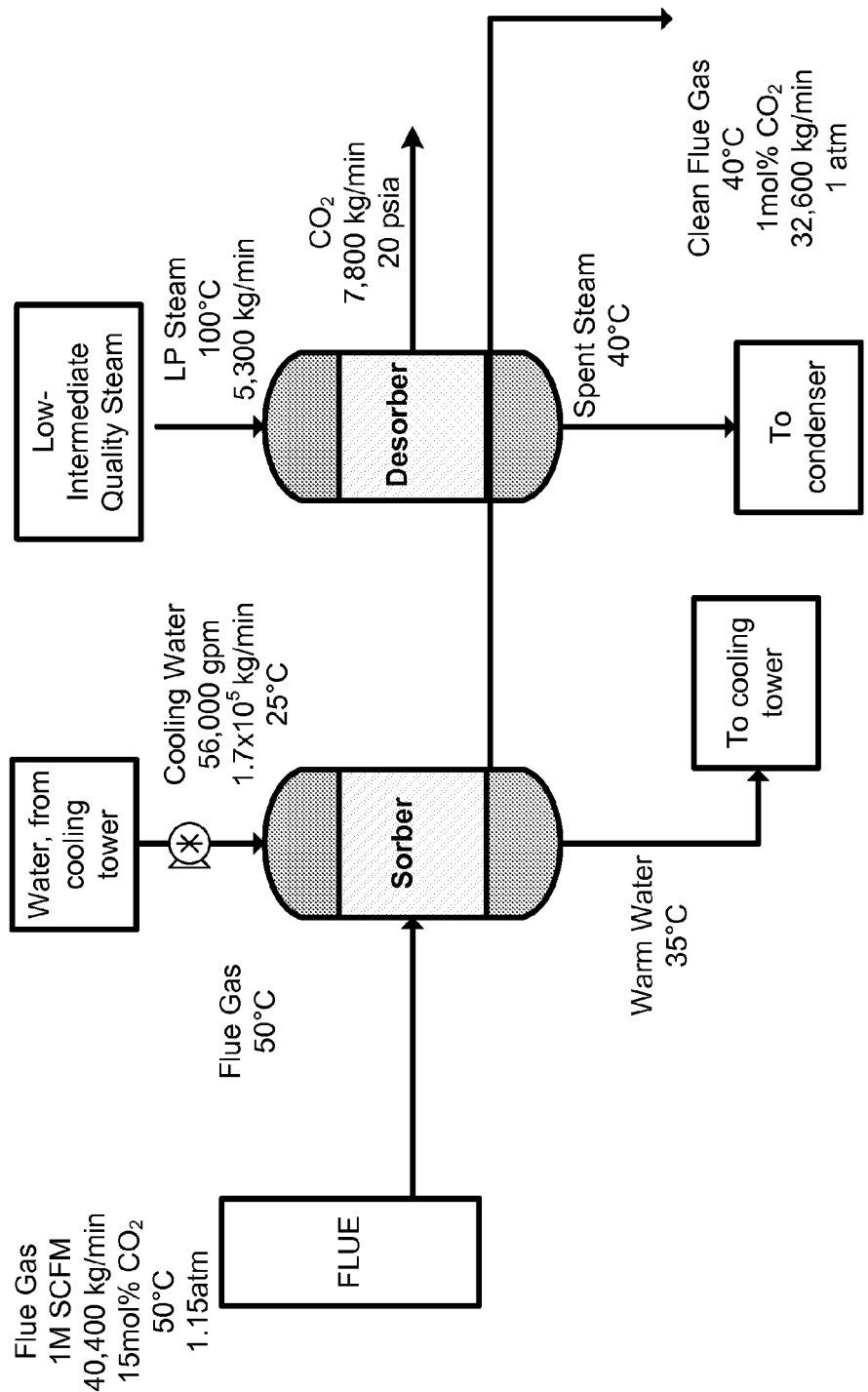
FIG. 5 is a schematic illustrating an RTSA system design overview.
Figure 6:
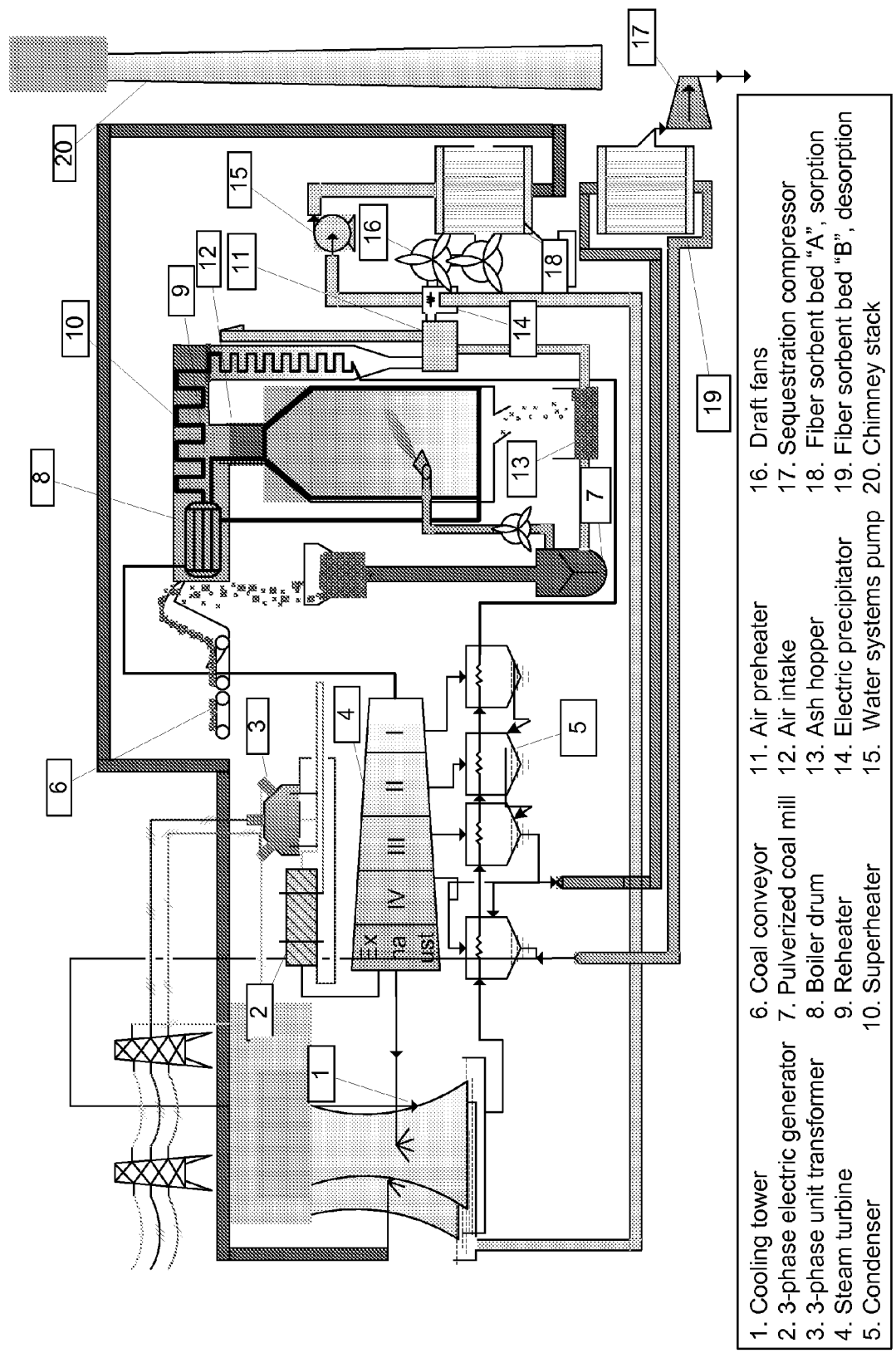
FIG. 6 is a schematic illustrating an overview of the fiber sorbent RSTA system integration into a PC station.

The desorption pressure of 20 psia allows approximately 25% of the gas to flow out due to pressure differences. To flush out the rest, the desorption step will begin, and the pressure differential will push out the rest of the product gas at atmospheric pressure. There are certainly possibilities for flue gas recycle streams to aid in the desorption step. From here, the $CO_2$ product gas will be pressurized and sent to sequestration facilities. An overview of the system can be seen in FIGS. 5 and 6. Several unit operations were added to a typical power station, including water pumps, a second cooling tower, two fans in series, and a sequestration compressor. As can be seen from the process integration diagram, this system can easily be retrofitted onto NGCC and IGCC plants.

In the design of the RTSA system, the OD and ID of the fibers as well as the sorbents were chosen to suit the system design; however, further material identification was needed. To complete the system design the proper fiber materials and construction of the fiber needed to be matched to the system requirements. The first choice made was the choice of polymer. Two candidates were considered, Hydrin©, and cellulose acetate. The first, the elastomer Hydrin©, was considered due to its robust physical properties. Hydrin© has many issues, however, mainly in the difficulty associated with spinning elastomers. The next choice, cellulose acetate, was chosen as a model glassy polymer due to its ease of availability and wealth of research performed on the polymer. Furthermore, cellulose acetate has a high $T_g$ which will allow it to withstand the rapid thermal cycles associated with the RTSA system. The $T_g$ of cellulose acetate in humid conditions drops considerably, and the effects of this require further study.

Figure 7:
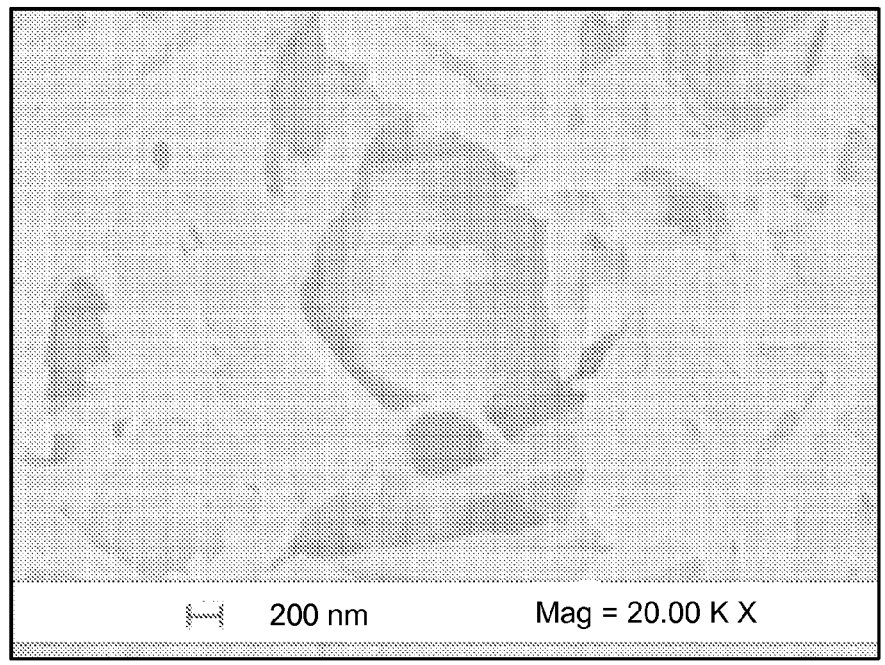
FIG. 7 illustrates provides micrograph illustrating the "sieve-in-cage" morphology.

The next design consideration for the hollow fibers was the organic/inorganic interface morphology. In order to maximize mass transfer rates to the sorbents, the "sieve in a cage" morphology was chosen as a goal. "Sieve in a cage" is a phenomenon where the filler particles are poorly adhered (or not at all adhered) to the polymer matrix. (See, FIG. 7). Polymer-filler incompatibilities as well as polymer stress accumulation during solvent exchange are believed to be the cause behind "sieve in a cage".

One aspect of the fiber design is the construction of the lumen side barrier layer and the choice of material for this barrier layer. Two methods were considered for constructing this barrier layer: dual layer spinning and post-treatment procedures. Dual layer spinning allows lumen layer to be directly created as the hollow fiber is forming. This example focused on post-treatment of the fibers. Post-treatment methods typically involve washing the outside of the fiber with an appropriate caulking polymer. In this design, the post-treatment would take place inside the bore of the fiber. Polyvinylidene dichloride (PVDC) latex was chosen as the main candidate for this application. The polymer has very low water and gas permeation rates, and sufficient heat resistance for the rapid thermal cycles in this system.

Example 3

Experimental Methodology

N-methyl-pyrrolodine (NMP) (ReagentPlus™ 99%, Sigma-Aldrich, Milwaukee, Wis.) was used as the solvent in the polymer solutions because it is miscible in water and a strong solvent for cellulose acetate. Methanol (99.8%, ACS Reagent, Sigma-Aldrich) and hexanes (ACS Reagent, >98.5%, Baker) were used for the solvent exchange portion of the fiber formation. Methanol was used to remove excess water from the fibers, and hexanes were used to exchange excess methanol from the fibers. The intent is to replace high surface tension fluids with lower surface tension fluids to prevent capillary forces from collapsing the pore structure during drying. All solvents and non-solvents were used as-received with no purification or modification.

Zeolite 13X (1-3 micron particles, Sigma-Aldrich) was chosen as the sorbent to be dispersed into the polymer matrix. Once received, the zeolites were dried at 230° C. to drive off any excess organics from synthesis. After drying, the zeolites were allowed to saturate with humid air. This was done to prevent the zeolites from adsorbing NMP or water in the polymer solutions and moving the solution away from the binodal line.

Cellulose acetate (MW 60,000, Sigma-Aldrich) and PVP (MW 55,000, Sigma-Aldrich) were the polymers used in this example. All polymers were dried in vacuum at 110° C. for one day to drive off sorbed water. After drying, the polymers were directly added to their respective solutions. PVP was chosen as a pore former over $LiNO_3$, a traditional pore former, because $LiNO_3$ was found to break down the cellulose acetate fibers. PVDC latex was supplied by SolVin Chemicals.

A fiber spinning apparatus was used to create the fiber sorbents. The apparatus was designed and built in such a way that it emulates industrial fiber systems and is readily scalable. Recently, many spinning apparatus have been utilizing dual-layer spinnerets such that two polymer layers may be spun in contact at the same time, with one polymer serving as the core layer and other acting as the separating sheath layer.

The polymer-sorbent spin dopes were prepared by mixing 80% of the required amounts of NMP and de-ionized water into a 1 l glass jar sealed with a PTFE cap. A prime dope was made by mixing 20% of the required amounts of NMP and water into a 500 ml glass jar with PTFE cap. Next, 20% of the required amount of dried cellulose acetate and PVP were added to the solution. The solution was mixed on a roller at 50° C. until complete dissolution occurred. Zeolite 13X, at equilibrium with ambient humidity conditions, was next added to the NMP/$H_2O$ mixture, and sonicated (1000 W max horn, Dukane, Leesburg, Va.) 3 times for 1 minute with 30 second breaks. The prime solution was then added to the sonication solution, and two more sonication cycles were performed. Finally, the remaining dried cellulose acetate and PVP were added to the mixture and placed on a roller at 50° C. until complete dissolution occurred. Dopes in varying solvent, non-solvent, and zeolite composition were made to determine the binodal line of the ternary system using the cloud point technique to determine one-phase or two-phase regime. Pure polymer solutions were made first to determine the pure polymer binodal; once this was determined, the polymers to liquids ratio was held the same, and the NMP to $H_2O$ ratio was held the same as the zeolites were added in. These sample dopes were loaded into syringes and extruded into DI $H_2O$ to qualitatively determine the speed of phase separation.

Figure 8:
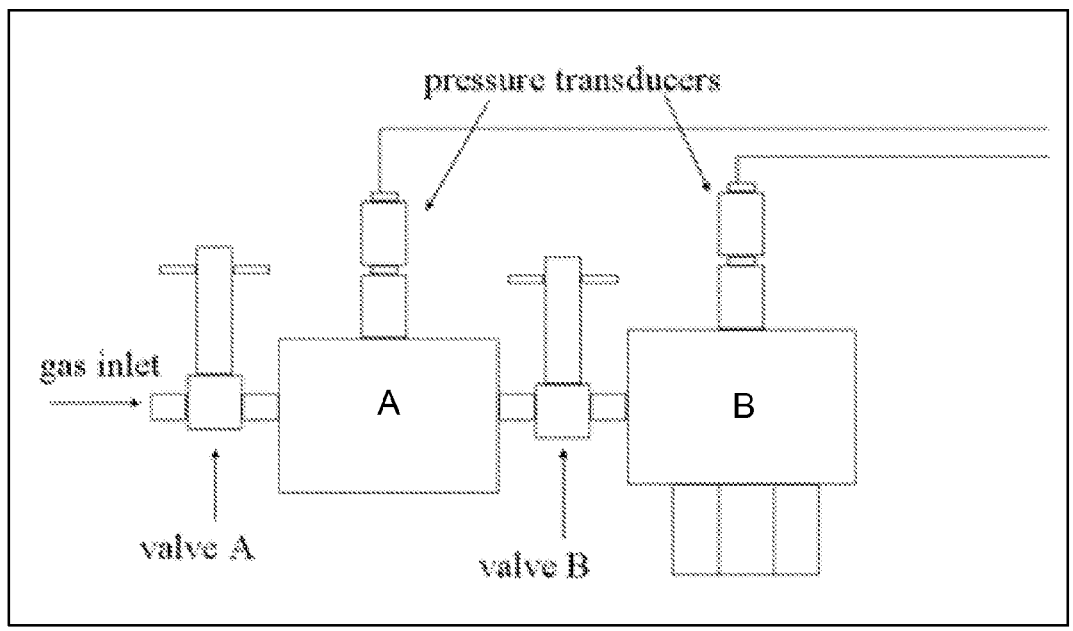
FIG. 8 is a schematic illustrating a pressure decay sorption system.

The pressure-decay sorption method was used to determine the sorption isotherms of the fiber sorbent, and a schematic of the sorption can be seen in FIG. 8. The sorption cells were immersed in constant temperature oil baths. After loading the fiber sorbent samples, the oil baths were set to 110° C. and sample cells were exposed to a vacuum to completely evacuate the cell and the fiber sorbents. After the drying step, the oil bath was set to 45° C. and $CO_2$ was introduced to the reservoir (A) and given time to come equilibrium. After thermal equilibrium was established, the sample valve (B) was briefly opened to introduce the $CO_2$ to the fiber sorbent sample. The pressure decay over time was recorded for each expansion, and from a mole balance between the two reservoirs, a sorption isotherm was generated. From this, fiber sorbent kinetics can be measured, as can the fiber sorbent isotherms. Due to the constraints of the experiment, however, it is not possible to moderate local thermal heat effects within the sample cell as in the actual RTSA system.

The gas transport properties of the untreated fiber sorbents were characterized using pure $N_2$ and $CO_2$ at bore-side feed pressures of 20-30 psig. Shell-side permeate flow rates were measured using bubble flow meters every 45 minutes until the readings were within 5% of the previous reading. Treated fibers were measured using pure $N_2$ and $CO_2$ at bore-side feed pressures of 70-80 psig, and permeate flow rates were by downstream pressure transducers once steady state was achieved. Scanning electron microscopy (SEM) was used to determine fiber sorbent pore structure, polymer-filler interfaces, and probe for lumen layer defects. Solvent exchanged fibers were soaked in hexane for 2 minutes, transferred to liquid $N_2$, and sheared in half using two fine point tweezers. These fibers were then sputter coated with a 10-20 nm thick gold coating (Model P-S1, ISI, Mountain View, Calif.), and transferred to a high resolution Field Emission Scanning Electron Microscope, Leo 1530 (Leo Electron Microscopy, Cambridge, UK).

The post-treatment method was performed by diluting the PVDC latex with the required amount of DI $H_2O$ (40 vol % latex, 60 vol % $H_2O$). This diluted latex was then loaded into an ISCO pump (Model 500DM, Isco, Lincoln, Nebr.), and attached to a fiber permeation module. The solution was pumped through the bore of the fibers at 10 psig for 15 seconds. Then, the module was connected to a $N_2$ cylinder and humid $N_2$ (50% R.H. was swept through the bores of the fibers at 30 psig for 10 minutes and the effluent R.H was 40%. This cycle was repeated twice. Finally, dry $N_2$ was swept through the bores at 30 psig until the effluent R.H. was found to be 0% (typically 1 hour).

Example 4

Analysis of Fiber Compositions

Using the cloud point techniques and syringe extrusion, the final polymer dope solution chosen was 10 wt % CA/4% PVP/30% zeolite 13X/49.3% NMP/6.7% water. In the dry phase, this corresponds to 75 wt % zeolite loading. This solution was chosen because of its rapid phase separation compared to other CA solutions and its high filler loading. Dopes with higher polymers to liquids ratio phase separated very slowly and would not have been ideal for spinning. Dopes with higher zeolite concentrations could not be drawn into a hollow fiber without fracturing.

The first series of spins concentrated on creating monolithic hollow fibers at 75 wt % zeolite 13X. The main challenges were the phase separation time of the CA dopes, control over the large OD (for polymeric hollow fibers) while still retaining the ability to draw the fibers, and determination of the bore fluid composition. Considering these challenges, the spin states used can be found in Table 2.

TABLE 2

| Spin Dopes | | Spin States | |
|---|---|---|---|
| Component | Core Dope (wt %) | Parameter | |
| CA | 10 | Core Flow Rate | 100 ml/hr |
| PVP | 4 | Bore Flow Rate | 250 ml/hr |
| 13X | 30 | Bore Composition | 80/20:NMP/$H_2O$ |
| NMP | 49.3 | Operating Temperature | 25° C. |
| $H_2O$ | 6.7 | Take-up Rate | 11.7 m/min |
| — | — | Air Gap | 3 cm |

A deep coagulation bath was used to provide more time for the nascent fibers to completely separate. The low take up rates were used due to the large OD requirements, and the high extrusion rates were used to manipulate the die swell of the line such that the fibers were initially close to the required OD. The bore fluid was chosen to be mainly NMP so that the water would not rapidly phase separate the interior of the fiber and remove the potential for the fiber to drawn onto the drum. Finally, the air gap was set very low to emulate wet-spinning without actually submerging the spinneret and causing phase separation in the annulus. Wet-spinning was desirable so that non-solvent evaporation could not occur in the air gap (as in dry-wet spinning) and form a dense layer. The resulting fibers were found to be mechanically strong and were able to go through normal fiber potting procedures.

SEM images of these fibers reveal that many of the fiber design objectives were achieved. As can be seen in FIG. 9A, the fiber OD and ID are close to the design goal, with the OD being 1100 micrometers, and the ID being 300 micrometers. Secondly, from FIG. 9B, good sorbent dispersion can be seen throughout the polymer matrix. Finally, FIG. 9C indicates the presence of the "sieve-in-a-cage" morphology, a key factor for rapid mass transport through the fibers.

Gas permeation was performed on this monolithic hollow fiber to determine the rate of mass transfer through the fibers. The fibers were found to be non-selective, with a $N_2$ permeation rate of 60,000 gas permeation units (GPU), where $$1\ GPU = \frac{10^6 \cdot cm^3}{cm^2 \cdot s \cdot cmHg}$$

which indicated that the fiber's pore structure was open and continuous.

Figure 10:
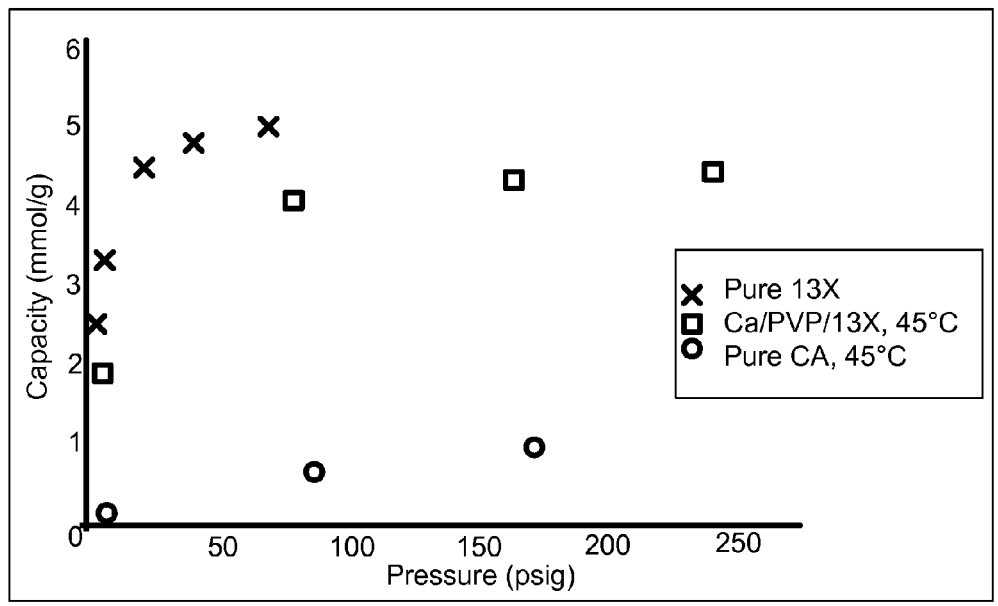
FIG. 10 graphically depicts fiber sorbents and fiber sorbent components isotherms.
Figure 11:
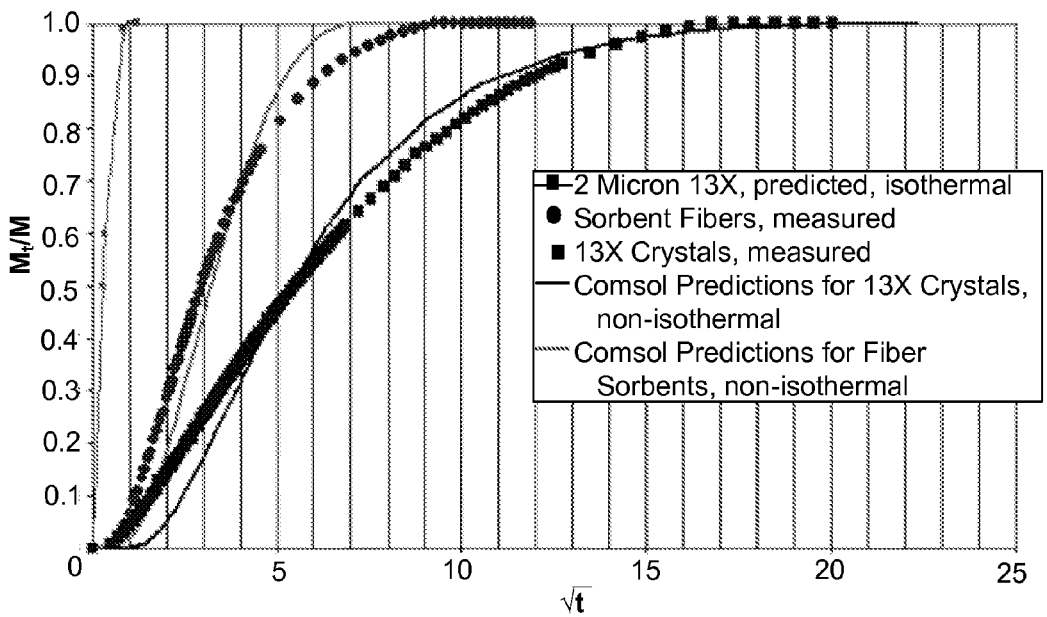
FIG. 11 graphically depicts the mass transfer comparisons between pure 13X and sorbent fibers embedded with 13X.
Figure 13:
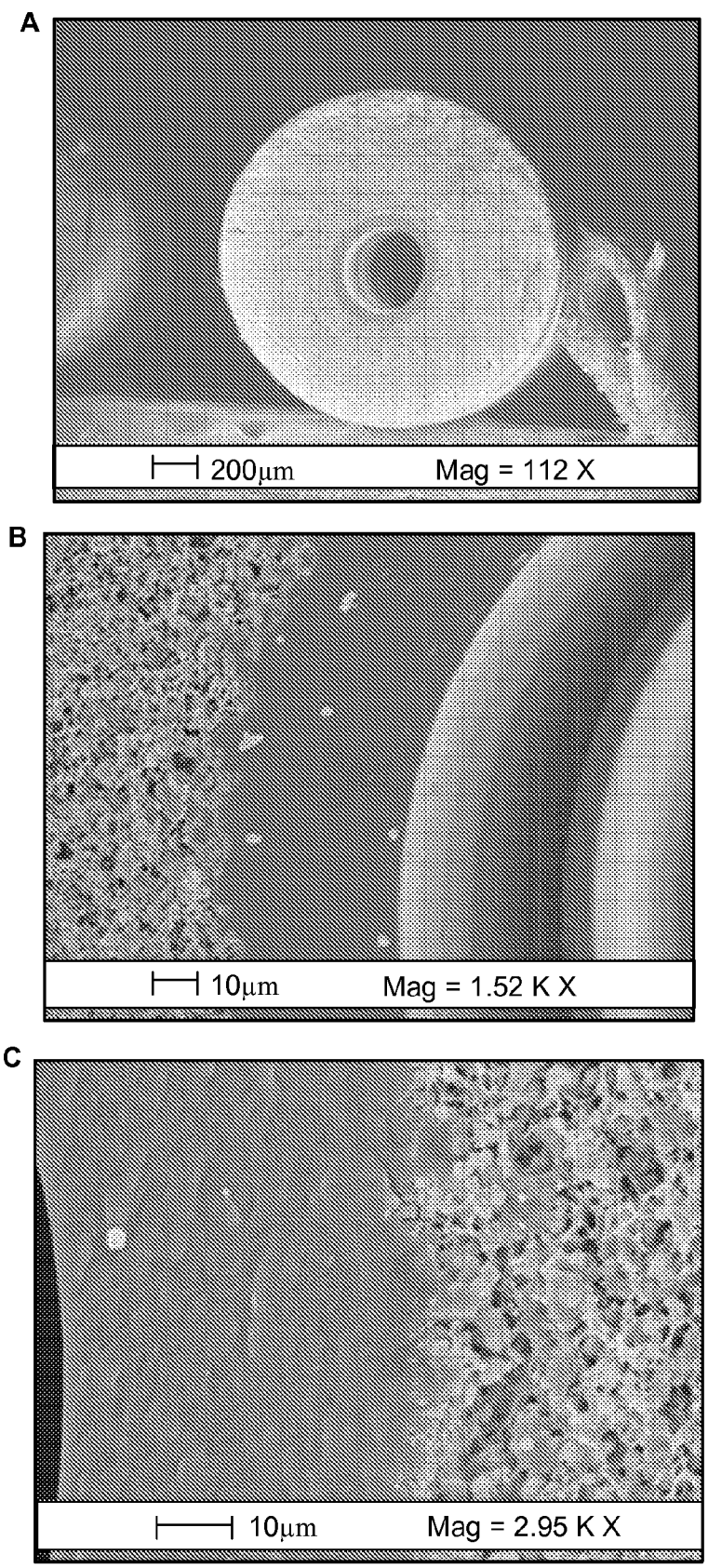
FIGS. 13 A-C are scanning electron micrographs of a PVDC lumen layer (A) and a close-up acrylic lumen layer (B, C).

Sorption experiments on the fiber sorbents were compared with literature results for zeolite 13X adjusted to the correct temperature and literature results for CA at the correct temperature. The fiber sorption isotherms can be seen on FIG. 10, below, and lend confirmation to the zeolite loading in the fibers. The polymer and zeolite sorption capacities are additive within the fiber (as in, 75% of pure zeolite capacity added to 25% of pure CA capacity results in the fiber sorbent capacity). Using the first expansion, sorption kinetics on the sorbent fibers were performed. One of the main limitations of the sorption techniques is the dissipation of heat generated by the release of the heat of sorption. As can be seen in FIG. 13, the measured half-time was about 7 seconds. A likely cause of the slower than predicted kinetics is that as the $CO_2$ sorbs onto the surface of the 13X, there is an unmediated local temperature rise due to the released heat of sorption. This local heat rise would cause the sorption isotherm to temporarily shift downwards, thus lowering the equilibrium capacity of the sorbent. Due to heat conduction from the oil bath, this temperature rise will eventually be mediated, and the sorption will go to equilibrium. In the RTSA system, the intimate contact of the fiber walls with cool water as a heat transfer fluid should mediate some of these local temperature spikes. A COMSOL model was developed to measure the time for heat to conduct out of the sorption cell assuming a step change in temperature. The time for the heat to be fully dissipated was plotted on the same figure, and clearly, the time for heat transfer is the dominating factor for sorption. (See, FIG. 11).

Figure 12:
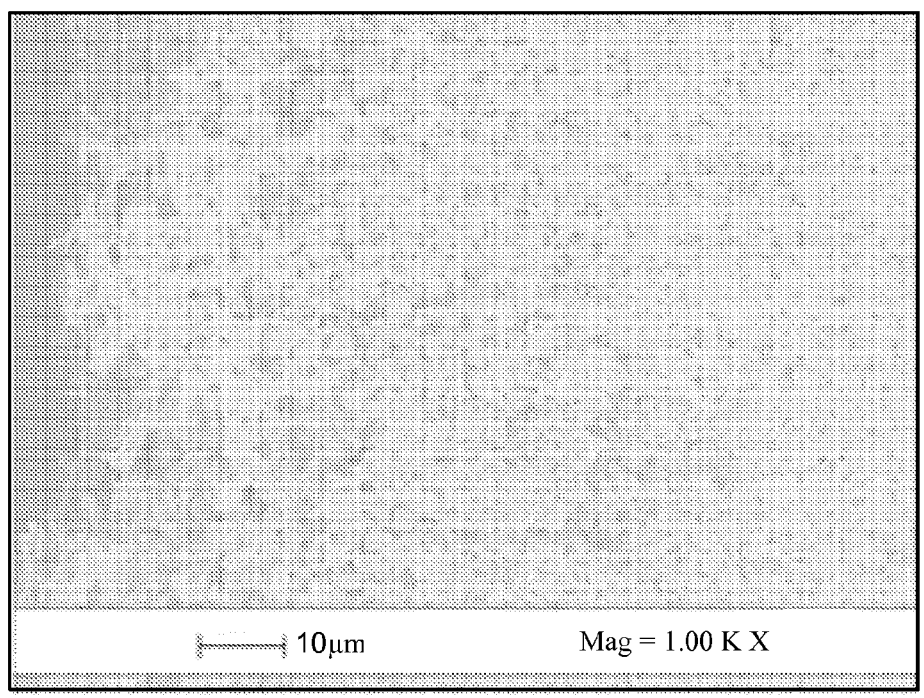
FIG. 12 is a scanning electron micrograph showing the porosity gradient in fiber sorbents.
Figure 14:
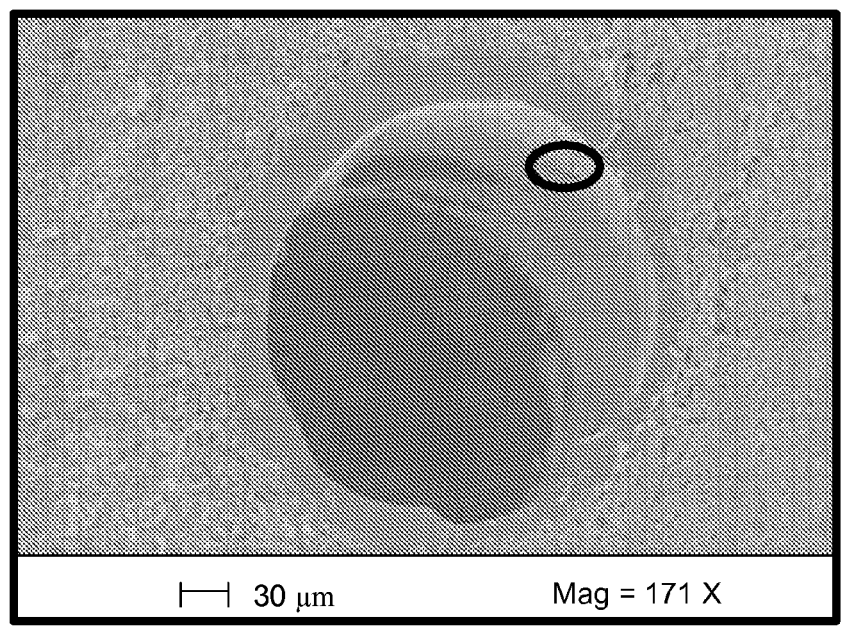
FIG. 14 is a scanning electron micrograph of a lumen layer with visible pinhole defects.

The PVDC latex post-treatment method proved to be a simple and successful lumen layer creation method. The latex was diluted by 60 vol % with DI $H_2O$ so that the latex could easily flow through the fiber bore at 10 psig. At dilution levels lower than this, the latex solution was found to block the fiber bore. From FIGS. 9 A-C and FIG. 12, a porosity gradient extending outwards from the bore can be seen, with the fiber densifying towards the shell-side of the fiber and being more porous towards the bore-side of the fiber. This change in porosity acts as an intrinsic backstop to the flow of latex through the bore at approximately 30 microns, and this can be seen in FIGS. 13 A-C. The latex post-treatment resulted in a very dense barrier layer that does not occupy any additional space within the bore, and requires little area within the active area of the sorbent fiber body. The latex moves through porous region around the bore via capillary forces, allowing every pore to be filled. During the $N_2$ sweep, excess water in the latex is carried away, causing the surface tension of the evaporating water to draw the polymer particles closer together, where surfactants on the particle surface allow the particles to entangle and form an intrinsically defect free layer. Humid $N_2$ was used to control the drying rate, so that defects in the PVDC layer were not locked in permanently. Without humid $N_2$, pinholes in the barrier layer were detected, most likely due to high water evaporation rates. (See, FIG. 14). To aid in the development of the barrier layer, the post-treated fiber was placed into a vacuum oven at 100° C. for 24 hours to anneal the PVDC film. $CO_2$ and $N_2$ gas permeation were performed on the post-treated sorbent fibers. The dense PVDC layer provides a significant resistance to gas transport, reducing the $N_2$ permeance down to approximately 0.5 GPU at 70 psig. As bore side feed pressure increased, the flux through the fiber wall increased, until the lumen layer burst at pressures of 150 psig.

Figure 15:
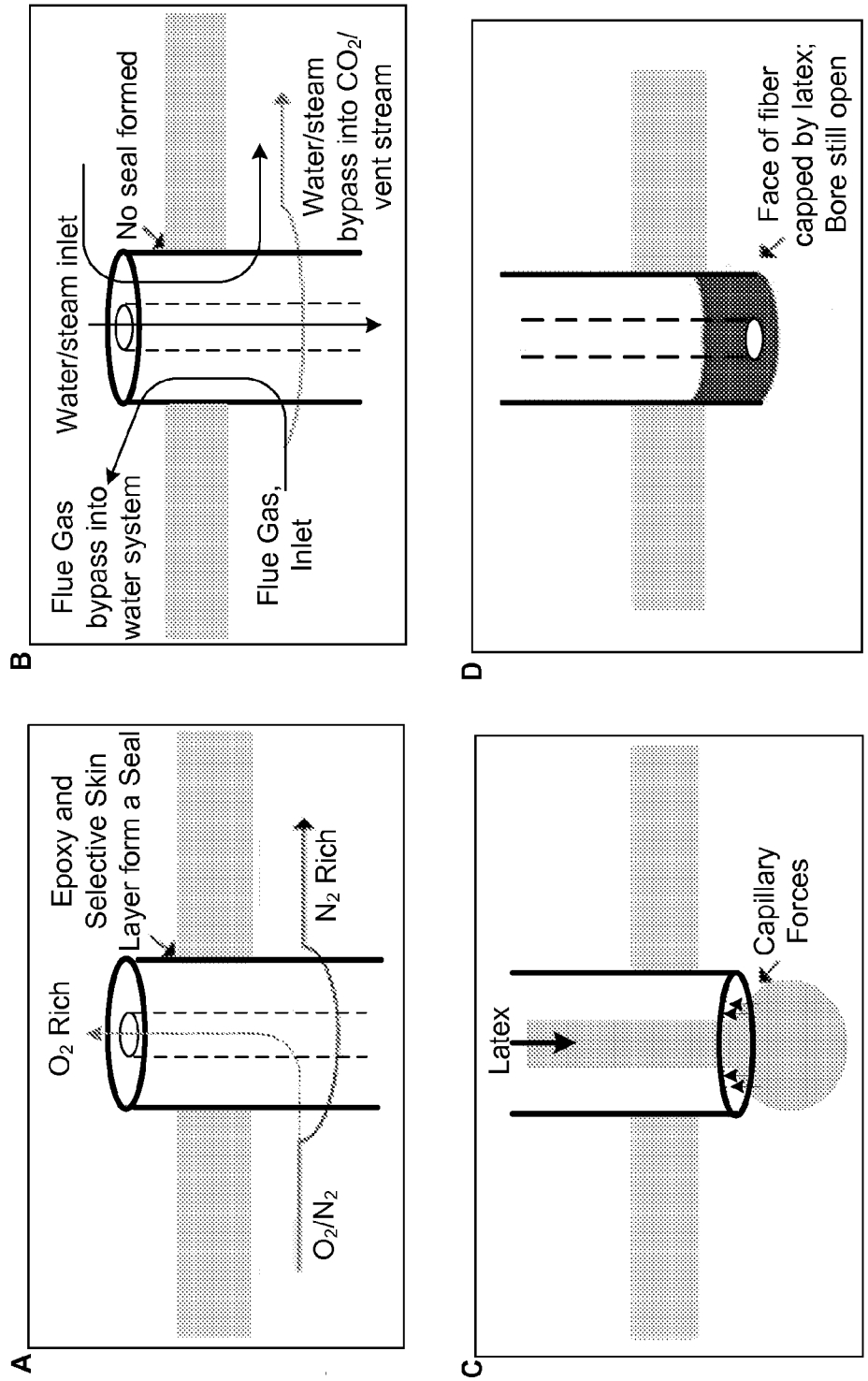
FIGS. 15 A-D are schematics of a typical hollow fiber operation (A), a lumen layer bypass in fiber sorbents (B), capillary forces during post-treatment were responsible for acrylic capping of fiber tip (C), and capped fiber tip with no lumen layer bypass (D).
Figure 16:
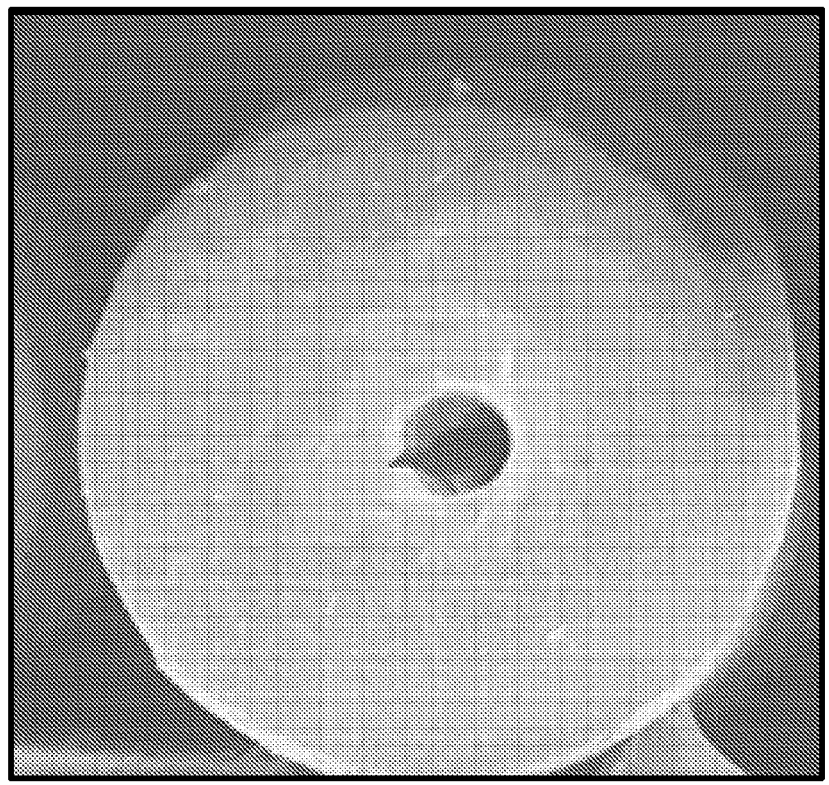
FIG. 16 is a scanning electron micrograph of a PVDC capped fiber tip.

An issue encountered with the fiber sorbents was that of lumen layer bypass. In a typical selective hollow fiber membrane, the outer selective skin seals against the potting material, thus forcing the feed streams to pass through the selective portion of the fiber (FIG. 15A). In a fiber sorbent, however, with the selective layer being on the interior of the fiber, no such seal exists. As such, water and steam, introduced boreside, could bypass through the core structure of the fiber into the shell-side of the manifold. Furthermore, flue gas from the shell-side feed could escape into the water and steam systems (FIG. 15B). Both of these issues, if not addressed, have the potential to render the RTSA system ineffective. To counter this, a method of "capping" the fibers at the potting seals was developed. During the post-treatment method, capillary forces present at the face of the fiber pull the latex back into the tip of the fiber. This latex was then dried using a $N_2$ sweep across the face of the fibers (FIGS. 15 C-D). This can be seen in FIG. 16. The success of this capping technique was confirmed by the ability to perform permeation experiments (an ineffective capping would result in permeation bypass).

What is claimed is:

1. A sorbent fiber, comprising:
    a hollow fiber comprising a sorbent material;
    a lumen disposed within the hollow fiber; and
    a barrier layer lining the lumen to prevent fluid communication between the lumen and the sorbent material.

2. The sorbent fiber of claim 1, wherein the fiber further comprises a polymer matrix.

3. The sorbent fiber of claim 2, wherein the polymer matrix comprises a plurality of tortuous pathways.

4. The sorbent fiber of claim 3, wherein the plurality of tortuous pathways comprise one or more of a micropore, a mesopore or a macropore, wherein the one or more of a micropore, a mesopore or a macropore are in fluid communication.

5. The sorbent fiber of claim 3, wherein the sorbent material is in fluid communication with at least a portion of the plurality of tortuous pathways.

6. The sorbent fiber of claim 1, wherein the sorbent material has an average longest dimension of less than about 10 micrometers.

7. The sorbent fiber of claim 1, wherein the fiber has an average longest cross-sectional dimension of at least about 100 micrometers.

8. The sorbent fiber of claim 1, wherein the lumen has an average longest cross-sectional dimension of at least about 55 micrometers.

9. The sorbent fiber of claim 1, wherein the sorbent material is less than about 80% by weight of a dry phase of the fiber.

10. The sorbent fiber of claim 1, wherein the fiber has an average longest cross-sectional dimension at least two times greater than that of the lumen.

11. The sorbent fiber of claim 1, wherein the barrier layer has an average thickness of less than about 50 micrometers.

12. The sorbent fiber of claim 1, wherein the sorbent material has a selectivity for carbon dioxide over nitrogen of about 10 to about 60 and a heat of sorption of about −25 kiloJoules per mole of carbon dioxide to about −90 kiloJoules per mole of carbon dioxide.

13. The sorbent fiber of claim 1, wherein the fiber comprises a non-porous end cap disposed at each longitudinal end of the fiber and the non-porous end cap does not inhibit fluid flow through the lumen.

\* \* \* \* \*